United States Patent
Wallace et al.

(10) Patent No.: US 8,750,151 B2
(45) Date of Patent: *Jun. 10, 2014

(54) CHANNEL CALIBRATION FOR A TIME DIVISION DUPLEXED COMMUNICATION SYSTEM

(75) Inventors: Mark S. Wallace, Boxborough, MA (US); John W. Ketchum, Boxborough, MA (US); Jay Rodney Walton, Boxborough, MA (US); Steven J. Howard, Boxborough, MA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 13/419,245

(22) Filed: Mar. 13, 2012

(65) Prior Publication Data

US 2012/0176928 A1     Jul. 12, 2012

Related U.S. Application Data

(63) Continuation of application No. 10/693,169, filed on Oct. 23, 2003, now Pat. No. 8,134,976.

(60) Provisional application No. 60/421,309, filed on Oct. 25, 2002, provisional application No. 60/421,462, filed on Oct. 25, 2002.

(51) Int. Cl.
| | | |
|---|---|---|
| *H04B 7/00* | (2006.01) | |
| *H04W 4/00* | (2009.01) | |
| *H04B 17/00* | (2006.01) | |
| *H04L 7/00* | (2006.01) | |
| *H04B 7/04* | (2006.01) | |
| *H04W 52/50* | (2009.01) | |
| *H04W 74/04* | (2009.01) | |
| *H04L 1/00* | (2006.01) | |

(52) U.S. Cl.
CPC ............ *H04B 7/0421* (2013.01); *H04W 52/50* (2013.01); *H04W 74/04* (2013.01); *H04L 1/00* (2013.01); *H04B 17/006* (2013.01)
USPC ........... 370/252; 370/230; 370/280; 370/321; 370/332; 370/344; 370/208; 370/302; 370/322; 370/343; 455/67.11; 455/101; 455/273; 455/277.2; 455/513; 375/332; 375/341; 375/347

(58) Field of Classification Search
CPC . H04B 7/0421; H04W 52/50; H04L 25/0248; H04L 1/0003; H04L 1/0009; H04L 1/0036; H04L 1/0631; H04L 1/208; H04L 25/067; H04L 5/0048; H04L 25/0226; H04L 25/0236; H04L 25/03318; H04L 5/0023
USPC .................................................. 370/228–352
See application file for complete search history.

(56) References Cited

U.S. PATENT DOCUMENTS

| | | |
|---|---|---|
| 4,736,371 A | 4/1988 | Tejima et al. |
| 4,750,198 A | 6/1988 | Harper |

(Continued)

FOREIGN PATENT DOCUMENTS

| | | |
|---|---|---|
| AU | 2002259221 | 11/2002 |
| CA | 2690245 A1 | 10/2001 |

(Continued)

OTHER PUBLICATIONS 3 rd Generation Partnership Project (3GPP); Technical Specification Group (TSG); Radio Access Network (RAN); RF requirements f o r 1.28Mcps UTRA TDD option, 3GPP Standard; 3G TR 25.945, 3rd Generation Partnership Project (3GPP), Mobile Competence Centre ; 650, Route Des Lucioles ; F-06921 Sophia-Antipolis Cedex; France, No. V2.0.0, Dec. 20, 2000, pp. 1-144, XP050400193, [retreived on Dec. 20, 2000], p. 126.

(Continued)

Primary Examiner — Venkatesh Haliyur
(74) Attorney, Agent, or Firm — QUALCOMM IP Department; James Hunt Yancey, Jr.

(57) ABSTRACT

Techniques to calibrate downlink and uplink channels to account for differences in the frequency responses of transmit and receive chains are described. In one embodiment, pilots are transmitted on downlink and uplink channels and used to derive estimates of the downlink and uplink channel responses, respectively. Sets of correction factors are then determined based on estimates of downlink and uplink channel responses. A calibrated downlink channel is formed using a first set of correction factors for the downlink channel, and a calibrated uplink channel is formed using a second set of correction factors for the uplink channel. The first and second sets of correction factors may be determined using a matrix-ratio computation or a minimum mean square error computation. The calibration may be performed in real-time based on over-the-air transmission. Other aspects, embodiments, and features are also claimed and described.

34 Claims, 6 Drawing Sheets

(56) References Cited

U.S. PATENT DOCUMENTS

| | | | |
|---|---|---|---|
| 4,797,879 A | 1/1989 | Habbab et al. | |
| 5,239,677 A | 8/1993 | Jasinski | |
| 5,241,544 A | 8/1993 | Jasper et al. | |
| 5,295,159 A | 3/1994 | Kerpez | |
| 5,404,355 A | 4/1995 | Raith | |
| 5,422,733 A | 6/1995 | Merchant et al. | |
| 5,471,647 A | 11/1995 | Gerlach et al. | |
| 5,479,447 A | 12/1995 | Chow et al. | |
| 5,491,837 A | 2/1996 | Haartsen | |
| 5,493,712 A | 2/1996 | Ramesh et al. | |
| 5,506,861 A | 4/1996 | Bottomley | |
| 5,509,003 A | 4/1996 | Snijders et al. | |
| 5,528,581 A * | 6/1996 | De Bot | 370/203 |
| 5,606,729 A | 2/1997 | Damico et al. | |
| 5,638,369 A | 6/1997 | Ayerst et al. | |
| 5,677,909 A | 10/1997 | Heide | |
| 5,710,768 A | 1/1998 | Ziv et al. | |
| 5,729,542 A | 3/1998 | Dupont | |
| 5,790,550 A | 8/1998 | Peeters et al. | |
| 5,818,813 A | 10/1998 | Saito et al. | |
| 5,822,374 A | 10/1998 | Levin | |
| 5,832,387 A | 11/1998 | Bae et al. | |
| 5,859,875 A | 1/1999 | Kato et al. | |
| 5,867,478 A * | 2/1999 | Baum et al. | 370/203 |
| 5,867,539 A | 2/1999 | Koslov | |
| 5,883,887 A | 3/1999 | Take et al. | |
| 5,886,988 A | 3/1999 | Yun et al. | |
| 5,959,965 A | 9/1999 | Ohkubo et al. | |
| 5,973,638 A | 10/1999 | Robbins et al. | |
| 5,982,327 A | 11/1999 | Vook et al. | |
| 6,005,876 A | 12/1999 | Cimini, Jr. et al. | |
| 6,011,963 A | 1/2000 | Ogoro | |
| 6,049,548 A | 4/2000 | Bruno et al. | |
| 6,067,290 A | 5/2000 | Paulraj et al. | |
| 6,072,779 A | 6/2000 | Tzannes et al. | |
| 6,084,915 A | 7/2000 | Williams | |
| 6,097,771 A | 8/2000 | Foschini | |
| 6,115,354 A | 9/2000 | Weck | |
| 6,122,247 A | 9/2000 | Levin et al. | |
| 6,131,016 A | 10/2000 | Greenstein et al. | |
| 6,141,388 A | 10/2000 | Servais et al. | |
| 6,141,542 A | 10/2000 | Kotzin et al. | |
| 6,141,567 A | 10/2000 | Youssefmir et al. | |
| 6,144,711 A | 11/2000 | Raleigh et al. | |
| 6,154,661 A | 11/2000 | Goldburg | |
| 6,163,296 A | 12/2000 | Lier et al. | |
| 6,167,031 A | 12/2000 | Olofsson et al. | |
| 6,175,588 B1 | 1/2001 | Visotsky et al. | |
| 6,178,196 B1 | 1/2001 | Naguib et al. | |
| 6,192,256 B1 | 2/2001 | Whinnett | |
| 6,205,410 B1 | 3/2001 | Cai | |
| 6,222,888 B1 | 4/2001 | Kao et al. | |
| 6,232,918 B1 | 5/2001 | Wax et al. | |
| 6,266,528 B1 | 7/2001 | Farzaneh | |
| 6,275,543 B1 | 8/2001 | Petrus et al. | |
| 6,278,726 B1 | 8/2001 | Mesecher et al. | |
| 6,292,917 B1 | 9/2001 | Sinha et al. | |
| 6,298,035 B1 | 10/2001 | Heiskala | |
| 6,298,092 B1 | 10/2001 | Heath, Jr. et al. | |
| 6,308,080 B1 | 10/2001 | Burt et al. | |
| 6,314,113 B1 | 11/2001 | Guemas | |
| 6,314,289 B1 | 11/2001 | Eberlein et al. | |
| 6,317,612 B1 | 11/2001 | Farsakh | |
| 6,330,277 B1 | 12/2001 | Gelblum et al. | |
| 6,330,293 B1 | 12/2001 | Klank et al. | |
| 6,330,462 B1 | 12/2001 | Chen | |
| 6,333,953 B1 | 12/2001 | Bottomley et al. | |
| 6,339,399 B1 | 1/2002 | Andersson et al. | |
| 6,345,036 B1 | 2/2002 | Sudo et al. | |
| 6,346,910 B1 | 2/2002 | Ito | |
| 6,347,234 B1 | 2/2002 | Scherzer | |
| 6,348,036 B1 | 2/2002 | Looney et al. | |
| 6,351,499 B1 | 2/2002 | Paulraj et al. | |
| 6,363,267 B1 | 3/2002 | Lindskog et al. | |
| 6,369,758 B1 | 4/2002 | Zhang | |
| 6,377,812 B1 | 4/2002 | Rashid-Farrokhi et al. | |
| 6,385,264 B1 | 5/2002 | Terasawa et al. | |
| 6,426,971 B1 | 7/2002 | Wu et al. | |
| 6,452,981 B1 | 9/2002 | Raleigh et al. | |
| 6,463,290 B1 | 10/2002 | Stilp et al. | |
| 6,473,467 B1 | 10/2002 | Wallace et al. | |
| 6,478,422 B1 | 11/2002 | Hansen | |
| 6,492,942 B1 | 12/2002 | Kezys | |
| 6,510,184 B1 | 1/2003 | Okamura | |
| 6,512,737 B1 | 1/2003 | Agee | |
| 6,515,617 B1 | 2/2003 | Demers et al. | |
| 6,532,225 B1 | 3/2003 | Chang et al. | |
| 6,532,255 B1 | 3/2003 | Gunzelmann et al. | |
| 6,532,562 B1 | 3/2003 | Chou et al. | |
| 6,545,997 B1 | 4/2003 | Bohnke et al. | |
| 6,574,211 B2 | 6/2003 | Padovani et al. | |
| 6,574,267 B1 | 6/2003 | Kanterakis et al. | |
| 6,574,271 B2 | 6/2003 | Mesecher et al. | |
| 6,594,473 B1 | 7/2003 | Dabak et al. | |
| 6,594,798 B1 | 7/2003 | Chou et al. | |
| 6,597,682 B1 | 7/2003 | Kari | |
| 6,608,874 B1 | 8/2003 | Beidas et al. | |
| 6,611,231 B2 | 8/2003 | Crilly et al. | |
| 6,615,024 B1 | 9/2003 | Boros et al. | |
| 6,628,702 B1 | 9/2003 | Rowitch et al. | |
| 6,631,121 B1 | 10/2003 | Yoon | |
| 6,636,496 B1 | 10/2003 | Cho et al. | |
| 6,636,568 B2 | 10/2003 | Kadous | |
| 6,654,590 B2 | 11/2003 | Boros et al. | |
| 6,654,613 B1 | 11/2003 | Maeng et al. | |
| 6,668,161 B2 | 12/2003 | Boros et al. | |
| 6,683,916 B1 | 1/2004 | Sartori et al. | |
| 6,690,660 B2 | 2/2004 | Kim et al. | |
| 6,693,992 B2 | 2/2004 | Jones et al. | |
| 6,694,155 B1 * | 2/2004 | Chin et al. | 455/562.1 |
| 6,697,346 B1 | 2/2004 | Halton et al. | |
| 6,711,121 B1 | 3/2004 | Gerakoulis et al. | |
| 6,728,233 B1 | 4/2004 | Park et al. | |
| 6,731,668 B2 | 5/2004 | Ketchum | |
| 6,735,188 B1 | 5/2004 | Becker et al. | |
| 6,738,020 B1 | 5/2004 | Lindskog et al. | |
| 6,744,811 B1 | 6/2004 | Kantschuk | |
| 6,747,963 B1 | 6/2004 | Park et al. | |
| 6,751,187 B2 | 6/2004 | Walton et al. | |
| 6,751,199 B1 | 6/2004 | Sindhushayana et al. | |
| 6,751,444 B1 | 6/2004 | Meiyappan | |
| 6,751,480 B2 | 6/2004 | Kogiantis et al. | |
| 6,757,263 B1 | 6/2004 | Olds | |
| 6,760,313 B1 | 7/2004 | Sindhushayana et al. | |
| 6,760,388 B2 | 7/2004 | Ketchum et al. | |
| 6,760,882 B1 | 7/2004 | Gesbert et al. | |
| 6,763,244 B2 | 7/2004 | Chen et al. | |
| 6,768,727 B1 | 7/2004 | Sourour et al. | |
| 6,771,706 B2 | 8/2004 | Ling et al. | |
| 6,785,341 B2 | 8/2004 | Walton et al. | |
| 6,785,513 B1 | 8/2004 | Sivaprakasam | |
| 6,788,948 B2 | 9/2004 | Lindskog et al. | |
| 6,792,041 B1 | 9/2004 | Kim et al. | |
| 6,795,424 B1 | 9/2004 | Kapoor et al. | |
| 6,798,738 B1 | 9/2004 | Do et al. | |
| 6,801,790 B2 | 10/2004 | Rudrapatna | |
| 6,802,035 B2 | 10/2004 | Catreux et al. | |
| 6,804,191 B2 | 10/2004 | Richardson | |
| 6,821,535 B2 | 11/2004 | Nurmi et al. | |
| 6,842,460 B1 | 1/2005 | Olkkonen et al. | |
| 6,847,828 B2 | 1/2005 | Miyoshi et al. | |
| 6,850,252 B1 | 2/2005 | Hoffberg | |
| 6,850,498 B2 | 2/2005 | Heath et al. | |
| 6,859,503 B2 | 2/2005 | Pautler et al. | |
| 6,862,271 B2 | 3/2005 | Medvedev et al. | |
| 6,862,440 B2 | 3/2005 | Sampath | |
| 6,868,079 B1 | 3/2005 | Hunt | |
| 6,873,651 B2 | 3/2005 | Tesfai et al. | |
| 6,879,578 B2 | 4/2005 | Pan et al. | |
| 6,879,579 B1 | 4/2005 | Myles et al. | |
| 6,882,868 B1 | 4/2005 | Shattil | |
| 6,885,708 B2 | 4/2005 | Thomas et al. | |
| 6,888,809 B1 | 5/2005 | Foschini et al. | |
| 6,888,899 B2 | 5/2005 | Raleigh et al. | |

(56) References Cited

U.S. PATENT DOCUMENTS

| | | | |
|---|---|---|---|
| 6,891,858 B1 | 5/2005 | Mahesh et al. |
| 6,907,270 B1 | 6/2005 | Blanz |
| 6,920,192 B1 | 7/2005 | Laroia et al. |
| 6,920,194 B2 | 7/2005 | Stopler et al. |
| 6,927,728 B2 | 8/2005 | Vook et al. |
| 6,937,592 B1 | 8/2005 | Heath, Jr. et al. |
| 6,940,917 B2 | 9/2005 | Menon et al. |
| 6,950,632 B1 | 9/2005 | Yun et al. |
| 6,952,426 B2 | 10/2005 | Wu et al. |
| 6,952,454 B1 | 10/2005 | Jalali et al. |
| 6,956,813 B2 | 10/2005 | Fukuda |
| 6,956,906 B2 | 10/2005 | Tager et al. |
| 6,959,171 B2 | 10/2005 | Tsien et al. |
| 6,961,388 B2 | 11/2005 | Ling et al. |
| 6,963,742 B2 | 11/2005 | Boros et al. |
| 6,965,762 B2 | 11/2005 | Sugar et al. |
| 6,970,722 B1 * | 11/2005 | Lewis ................... 455/562.1 |
| 6,975,868 B2 | 12/2005 | Joshi et al. |
| 6,980,601 B2 | 12/2005 | Jones |
| 6,980,800 B2 | 12/2005 | Noerpel et al. |
| 6,985,434 B2 | 1/2006 | Wu et al. |
| 6,985,534 B1 | 1/2006 | Meister |
| 6,987,819 B2 | 1/2006 | Thomas et al. |
| 6,990,059 B1 | 1/2006 | Anikhindi et al. |
| 6,992,972 B2 | 1/2006 | Van Nee |
| 6,996,380 B2 | 2/2006 | Dent |
| 7,002,900 B2 | 2/2006 | Walton et al. |
| 7,003,044 B2 | 2/2006 | Subramanian et al. |
| 7,006,464 B1 | 2/2006 | Gopalakrishnan et al. |
| 7,006,483 B2 | 2/2006 | Nelson, Jr. et al. |
| 7,006,848 B2 | 2/2006 | Ling et al. |
| 7,009,931 B2 | 3/2006 | Ma et al. |
| 7,012,978 B2 | 3/2006 | Talwar |
| 7,020,110 B2 | 3/2006 | Walton et al. |
| 7,020,482 B2 | 3/2006 | Medvedev et al. |
| 7,020,490 B2 | 3/2006 | Khatri |
| 7,023,826 B2 | 4/2006 | Sjoberg et al. |
| 7,024,163 B1 | 4/2006 | Barratt et al. |
| 7,031,671 B2 | 4/2006 | Mottier |
| 7,035,359 B2 | 4/2006 | Molnar |
| 7,039,125 B2 | 5/2006 | Friedman |
| 7,042,858 B1 | 5/2006 | Ma et al. |
| 7,054,378 B2 | 5/2006 | Walton et al. |
| 7,058,367 B1 | 6/2006 | Luo et al. |
| 7,062,294 B1 | 6/2006 | Rogard et al. |
| 7,068,628 B2 | 6/2006 | Li et al. |
| 7,072,381 B2 | 7/2006 | Atarashi et al. |
| 7,072,410 B1 | 7/2006 | Monsen |
| 7,072,413 B2 | 7/2006 | Walton et al. |
| 7,076,263 B2 | 7/2006 | Medvedev et al. |
| 7,088,671 B1 | 8/2006 | Monsen |
| 7,095,709 B2 | 8/2006 | Walton et al. |
| 7,095,722 B1 | 8/2006 | Walke et al. |
| 7,099,377 B2 | 8/2006 | Berens et al. |
| 7,103,325 B1 | 9/2006 | Jia et al. |
| 7,110,378 B2 | 9/2006 | Onggosanusi et al. |
| 7,110,463 B2 | 9/2006 | Wallace et al. |
| 7,113,499 B2 | 9/2006 | Nafie et al. |
| 7,116,652 B2 | 10/2006 | Lozano |
| 7,120,134 B2 | 10/2006 | Tiedemann, Jr. et al. |
| 7,120,199 B2 | 10/2006 | Thielecke et al. |
| 7,127,009 B2 | 10/2006 | Berthet et al. |
| 7,130,362 B2 | 10/2006 | Girardeau et al. |
| 7,133,459 B2 | 11/2006 | Onggosanusi et al. |
| 7,137,047 B2 | 11/2006 | Mitlin et al. |
| 7,149,239 B2 | 12/2006 | Hudson |
| 7,149,254 B2 | 12/2006 | Sampath |
| 7,151,809 B2 * | 12/2006 | Ketchum et al. ............. 375/347 |
| 7,155,171 B2 | 12/2006 | Ebert et al. |
| 7,158,563 B2 | 1/2007 | Ginis et al. |
| 7,164,649 B2 | 1/2007 | Walton et al. |
| 7,164,669 B2 | 1/2007 | Li et al. |
| 7,184,713 B2 | 2/2007 | Kadous et al. |
| 7,187,646 B2 | 3/2007 | Schramm |
| 7,190,749 B2 | 3/2007 | Levin et al. |
| 7,191,381 B2 | 3/2007 | Gesbert et al. |
| 7,194,237 B2 | 3/2007 | Sugar et al. |
| 7,197,084 B2 | 3/2007 | Ketchum et al. |
| 7,200,404 B2 | 4/2007 | Panasik et al. |
| 7,206,354 B2 | 4/2007 | Wallace et al. |
| 7,218,684 B2 | 5/2007 | Bolourchi et al. |
| 7,221,956 B2 | 5/2007 | Medvedev et al. |
| 7,224,704 B2 | 5/2007 | Lu et al. |
| 7,231,184 B2 | 6/2007 | Eilts et al. |
| 7,233,625 B2 | 6/2007 | Ma et al. |
| 7,238,508 B2 | 7/2007 | Lin et al. |
| 7,242,727 B2 | 7/2007 | Liu et al. |
| 7,248,638 B1 | 7/2007 | Banister |
| 7,248,841 B2 | 7/2007 | Agee et al. |
| 7,254,171 B2 | 8/2007 | Hudson |
| 7,260,153 B2 | 8/2007 | Nissani |
| 7,260,366 B2 | 8/2007 | Lee et al. |
| 7,263,119 B1 | 8/2007 | Hsu et al. |
| 7,274,734 B2 | 9/2007 | Tsatsanis |
| 7,277,679 B1 | 10/2007 | Barratt et al. |
| 7,280,467 B2 | 10/2007 | Smee et al. |
| 7,280,625 B2 | 10/2007 | Ketchum et al. |
| 7,283,508 B2 | 10/2007 | Choi et al. |
| 7,289,570 B2 | 10/2007 | Schmidl et al. |
| 7,292,854 B2 | 11/2007 | Das et al. |
| 7,298,778 B2 | 11/2007 | Visoz et al. |
| 7,298,805 B2 | 11/2007 | Walton et al. |
| 7,308,035 B2 | 12/2007 | Rouquette et al. |
| 7,310,304 B2 | 12/2007 | Mody et al. |
| 7,317,750 B2 | 1/2008 | Shattil |
| 7,324,429 B2 | 1/2008 | Walton et al. |
| 7,327,800 B2 | 2/2008 | Oprea et al. |
| 7,333,556 B2 | 2/2008 | Maltsev et al. |
| 7,342,912 B1 | 3/2008 | Kerr et al. |
| 7,356,004 B2 | 4/2008 | Yano et al. |
| 7,356,089 B2 | 4/2008 | Jia et al. |
| 7,379,492 B2 | 5/2008 | Hwang |
| 7,386,076 B2 | 6/2008 | Onggosanusi et al. |
| 7,392,014 B2 | 6/2008 | Baker et al. |
| 7,403,748 B1 | 7/2008 | Keskitalo et al. |
| 7,421,039 B2 | 9/2008 | Malaender et al. |
| 7,453,844 B1 | 11/2008 | Lee et al. |
| 7,466,749 B2 | 12/2008 | Medvedev et al. |
| 7,480,278 B2 | 1/2009 | Pedersen et al. |
| 7,486,740 B2 | 2/2009 | Inanoglu |
| 7,492,737 B1 | 2/2009 | Fong et al. |
| 7,508,748 B2 | 3/2009 | Kadous |
| 7,548,506 B2 | 6/2009 | Ma et al. |
| 7,551,546 B2 | 6/2009 | Ma et al. |
| 7,551,580 B2 | 6/2009 | Du Crest et al. |
| 7,573,805 B2 | 8/2009 | Zhuang et al. |
| 7,599,443 B2 | 10/2009 | Ionescu et al. |
| 7,603,141 B2 | 10/2009 | Dravida |
| 7,606,296 B1 | 10/2009 | Hsu et al. |
| 7,606,319 B2 | 10/2009 | Zhang et al. |
| 7,616,698 B2 | 11/2009 | Sun et al. |
| 7,623,871 B2 | 11/2009 | Sheynblat |
| 7,636,573 B2 | 12/2009 | Walton et al. |
| 7,646,747 B2 * | 1/2010 | Atarashi et al. ................ 370/329 |
| 7,653,142 B2 * | 1/2010 | Ketchum et al. ............... 375/267 |
| 7,653,415 B2 | 1/2010 | Van Rooyen |
| 7,822,140 B2 | 10/2010 | Catreux et al. |
| 7,885,228 B2 | 2/2011 | Walton et al. |
| 7,986,742 B2 | 7/2011 | Ketchum et al. |
| 8,134,976 B2 * | 3/2012 | Wallace et al. ............... 370/332 |
| 8,145,179 B2 | 3/2012 | Walton et al. |
| 8,169,944 B2 | 5/2012 | Walton et al. |
| 8,170,513 B2 | 5/2012 | Walton et al. |
| 8,194,770 B2 | 6/2012 | Medvedev et al. |
| 8,203,978 B2 | 6/2012 | Walton et al. |
| 8,208,364 B2 | 6/2012 | Walton et al. |
| 8,218,609 B2 | 7/2012 | Walton et al. |
| 8,254,246 B2 | 8/2012 | Ma et al. |
| 8,260,210 B2 * | 9/2012 | Esteve Asensio et al. . 455/67.11 |
| 8,320,301 B2 | 11/2012 | Walton et al. |
| 8,325,836 B2 | 12/2012 | Tong et al. |
| 8,355,313 B2 | 1/2013 | Walton et al. |
| 8,358,714 B2 | 1/2013 | Walton et al. |
| 8,406,118 B2 | 3/2013 | Ma et al. |

(56) References Cited

U.S. PATENT DOCUMENTS

| | | |
|---|---|---|
| 8,462,643 B2 | 6/2013 | Walton et al. |
| 8,483,188 B2 | 7/2013 | Walton et al. |
| 8,570,988 B2 * | 10/2013 | Wallace et al. ............... 370/338 |
| 2001/0017881 A1 | 8/2001 | Bhatoolaul et al. |
| 2001/0031621 A1 | 10/2001 | Schmutz |
| 2001/0046205 A1 | 11/2001 | Easton et al. |
| 2002/0003774 A1 | 1/2002 | Wang et al. |
| 2002/0004920 A1 | 1/2002 | Cho et al. |
| 2002/0018310 A1 | 2/2002 | Hung |
| 2002/0018453 A1 | 2/2002 | Yu et al. |
| 2002/0027951 A1 | 3/2002 | Gormley et al. |
| 2002/0041632 A1 | 4/2002 | Sato et al. |
| 2002/0044591 A1 | 4/2002 | Lee et al. |
| 2002/0044610 A1 | 4/2002 | Jones |
| 2002/0057659 A1 | 5/2002 | Ozluturk et al. |
| 2002/0062472 A1 | 5/2002 | Medlock et al. |
| 2002/0064214 A1 | 5/2002 | Hattori et al. |
| 2002/0075830 A1 | 6/2002 | Hartman, Jr. |
| 2002/0085620 A1 | 7/2002 | Mesecher |
| 2002/0085641 A1 | 7/2002 | Baum |
| 2002/0098872 A1 | 7/2002 | Judson |
| 2002/0105928 A1 | 8/2002 | Kapoor et al. |
| 2002/0115473 A1 | 8/2002 | Hwang et al. |
| 2002/0122381 A1 | 9/2002 | Wu et al. |
| 2002/0122393 A1 | 9/2002 | Caldwell et al. |
| 2002/0150182 A1 | 10/2002 | Dogan et al. |
| 2002/0154705 A1 | 10/2002 | Walton et al. |
| 2002/0183010 A1 | 12/2002 | Catreux et al. |
| 2002/0184453 A1 | 12/2002 | Hughes et al. |
| 2002/0191535 A1 | 12/2002 | Sugiyama et al. |
| 2002/0193146 A1 | 12/2002 | Wallace et al. |
| 2002/0196842 A1 | 12/2002 | Onggosanusi et al. |
| 2003/0002450 A1 | 1/2003 | Jalali et al. |
| 2003/0012308 A1 | 1/2003 | Sampath et al. |
| 2003/0039317 A1 | 2/2003 | Taylor et al. |
| 2003/0045288 A1 | 3/2003 | Luschi et al. |
| 2003/0048856 A1 | 3/2003 | Ketchum et al. |
| 2003/0072395 A1 * | 4/2003 | Jia et al. ............... 375/341 |
| 2003/0076812 A1 | 4/2003 | Benedittis |
| 2003/0078024 A1 | 4/2003 | Magee et al. |
| 2003/0095197 A1 | 5/2003 | Wheeler et al. |
| 2003/0099306 A1 | 5/2003 | Nilsson et al. |
| 2003/0103584 A1 | 6/2003 | Bjerke et al. |
| 2003/0112745 A1 | 6/2003 | Zhuang et al. |
| 2003/0119452 A1 | 6/2003 | Kim et al. |
| 2003/0123389 A1 | 7/2003 | Russell et al. |
| 2003/0125040 A1 | 7/2003 | Walton et al. |
| 2003/0128656 A1 | 7/2003 | Scarpa |
| 2003/0139194 A1 | 7/2003 | Onggosanusi et al. |
| 2003/0142732 A1 | 7/2003 | Moshavi et al. |
| 2003/0153360 A1 | 8/2003 | Burke et al. |
| 2003/0162519 A1 | 8/2003 | Smith et al. |
| 2003/0185311 A1 | 10/2003 | Kim |
| 2003/0186650 A1 | 10/2003 | Liu |
| 2003/0190897 A1 | 10/2003 | Lei et al. |
| 2003/0202492 A1 | 10/2003 | Akella et al. |
| 2003/0202612 A1 | 10/2003 | Halder et al. |
| 2003/0206558 A1 | 11/2003 | Parkkinen et al. |
| 2003/0235149 A1 | 12/2003 | Chan et al. |
| 2003/0235255 A1 | 12/2003 | Ketchum et al. |
| 2004/0005887 A1 | 1/2004 | Bahrenburg et al. |
| 2004/0017785 A1 | 1/2004 | Zelst |
| 2004/0037257 A1 | 2/2004 | Ngo |
| 2004/0052228 A1 | 3/2004 | Tellado et al. |
| 2004/0062192 A1 | 4/2004 | Liu et al. |
| 2004/0071104 A1 | 4/2004 | Boesel et al. |
| 2004/0071107 A1 | 4/2004 | Kats et al. |
| 2004/0076224 A1 | 4/2004 | Onggosanusi et al. |
| 2004/0081131 A1 | 4/2004 | Walton et al. |
| 2004/0085939 A1 * | 5/2004 | Wallace et al. ............... 370/335 |
| 2004/0087324 A1 * | 5/2004 | Ketchum et al. ............... 455/513 |
| 2004/0121730 A1 | 6/2004 | Kadous et al. |
| 2004/0151108 A1 | 8/2004 | Blasco Claret et al. |
| 2004/0151122 A1 | 8/2004 | Lau et al. |
| 2004/0160987 A1 | 8/2004 | Sudo et al. |
| 2004/0176097 A1 | 9/2004 | Wilson et al. |
| 2004/0198276 A1 | 10/2004 | Tellado et al. |
| 2004/0252632 A1 | 12/2004 | Bourdoux et al. |
| 2005/0047384 A1 | 3/2005 | Wax et al. |
| 2005/0047515 A1 | 3/2005 | Walton et al. |
| 2005/0099974 A1 | 5/2005 | Kats et al. |
| 2005/0120097 A1 | 6/2005 | Walton et al. |
| 2005/0128953 A1 * | 6/2005 | Wallace et al. ............... 370/241 |
| 2005/0135284 A1 | 6/2005 | Nanda et al. |
| 2005/0135295 A1 | 6/2005 | Walton et al. |
| 2005/0135308 A1 | 6/2005 | Vijayan et al. |
| 2005/0135318 A1 | 6/2005 | Walton et al. |
| 2005/0147177 A1 | 7/2005 | Seo et al. |
| 2005/0185575 A1 | 8/2005 | Hansen et al. |
| 2005/0195915 A1 | 9/2005 | Raleigh et al. |
| 2005/0208959 A1 | 9/2005 | Chen et al. |
| 2005/0220211 A1 | 10/2005 | Shim et al. |
| 2005/0245264 A1 | 11/2005 | Laroia et al. |
| 2005/0276343 A1 | 12/2005 | Jones |
| 2006/0018247 A1 | 1/2006 | Driesen et al. |
| 2006/0018395 A1 | 1/2006 | Tzannes |
| 2006/0039275 A1 | 2/2006 | Walton et al. |
| 2006/0067417 A1 | 3/2006 | Park et al. |
| 2006/0072649 A1 | 4/2006 | Chang et al. |
| 2006/0077935 A1 | 4/2006 | Hamalainen et al. |
| 2006/0104196 A1 | 5/2006 | Wu et al. |
| 2006/0104340 A1 | 5/2006 | Walton et al. |
| 2006/0114858 A1 | 6/2006 | Walton et al. |
| 2006/0153237 A1 | 7/2006 | Hwang et al. |
| 2006/0159120 A1 | 7/2006 | Kim |
| 2006/0176968 A1 | 8/2006 | Keaney et al. |
| 2006/0183497 A1 | 8/2006 | Paranchych et al. |
| 2006/0209894 A1 | 9/2006 | Tzannes et al. |
| 2006/0209937 A1 | 9/2006 | Tanaka et al. |
| 2007/0086536 A1 * | 4/2007 | Ketchum et al. ............... 375/260 |
| 2007/0177681 A1 | 8/2007 | Choi et al. |
| 2007/0274278 A1 | 11/2007 | Choi et al. |
| 2008/0267138 A1 | 10/2008 | Walton et al. |
| 2008/0285488 A1 | 11/2008 | Walton et al. |
| 2008/0285669 A1 | 11/2008 | Walton et al. |
| 2008/0285670 A1 | 11/2008 | Walton et al. |
| 2009/0129454 A1 | 5/2009 | Medvedev et al. |
| 2009/0161613 A1 | 6/2009 | Kent et al. |
| 2009/0291642 A1 * | 11/2009 | Cozzo et al. ............... 455/67.13 |
| 2010/0067401 A1 | 3/2010 | Medvedev et al. |
| 2010/0119001 A1 | 5/2010 | Walton et al. |
| 2010/0142636 A1 | 6/2010 | Heath, Jr. et al. |
| 2010/0183088 A1 | 7/2010 | Inanoglu |
| 2010/0208841 A1 | 8/2010 | Walton et al. |
| 2010/0260060 A1 | 10/2010 | Abraham et al. |
| 2010/0271930 A1 | 10/2010 | Tong et al. |
| 2011/0096751 A1 | 4/2011 | Ma et al. |
| 2011/0235744 A1 | 9/2011 | Ketchum et al. |
| 2012/0140664 A1 | 6/2012 | Walton et al. |
| 2012/0176928 A1 * | 7/2012 | Wallace et al. ............... 370/252 |
| 2013/0235825 A1 * | 9/2013 | Walton et al. ............... 370/329 |
| 2013/0279614 A1 * | 10/2013 | Walton et al. ............... 375/260 |

FOREIGN PATENT DOCUMENTS

| | | |
|---|---|---|
| CN | 1086061 | 4/1994 |
| CN | 1234661 | 11/1999 |
| CN | 1298266 A | 6/2001 |
| CN | 1308794 A | 8/2001 |
| CN | 1314037 A | 9/2001 |
| CN | 1347609 A | 5/2002 |
| CN | 1469662 | 1/2004 |
| CN | 1489836 A | 4/2004 |
| CN | 1537371 | 10/2004 |
| DE | 19951525 A1 | 6/2001 |
| EP | 0755090 A1 | 1/1997 |
| EP | 0762701 | 3/1997 |
| EP | 0772329 | 5/1997 |
| EP | 0805568 A1 | 11/1997 |
| EP | 0869647 A2 | 10/1998 |
| EP | 0895387 A1 | 2/1999 |
| EP | 0929172 A1 | 7/1999 |
| EP | 0951091 A2 | 10/1999 |
| EP | 0991221 A2 | 4/2000 |

(56) References Cited

FOREIGN PATENT DOCUMENTS

| | | |
|---|---|---|
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1126673 A2 | 8/2001 |
| EP | 1133070 | 9/2001 |
| EP | 1137217 | 9/2001 |
| EP | 1143754 A1 | 10/2001 |
| EP | 1170879 A1 | 1/2002 |
| EP | 1175022 A2 | 1/2002 |
| EP | 1182799 A2 | 2/2002 |
| EP | 1185001 A2 | 3/2002 |
| EP | 1185015 | 3/2002 |
| EP | 1185048 A2 | 3/2002 |
| EP | 1207635 A1 | 5/2002 |
| EP | 1207645 A1 | 5/2002 |
| EP | 1223702 A1 | 7/2002 |
| EP | 1241824 | 9/2002 |
| EP | 1265411 | 12/2002 |
| EP | 1315311 A1 | 5/2003 |
| EP | 1379020 | 1/2004 |
| EP | 1387545 | 2/2004 |
| EP | 1416688 A1 | 5/2004 |
| EP | 1447934 A1 | 8/2004 |
| GB | 2300337 | 10/1996 |
| GB | 2373973 A | 10/2002 |
| JP | 1132027 | 5/1989 |
| JP | 03104430 | 5/1991 |
| JP | 06003956 | 1/1994 |
| JP | 6501139 T | 1/1994 |
| JP | 8274756 A | 10/1996 |
| JP | 9135230 | 5/1997 |
| JP | 9266466 | 10/1997 |
| JP | 9307526 A | 11/1997 |
| JP | 09327073 | 12/1997 |
| JP | 9512156 | 12/1997 |
| JP | 10028077 | 1/1998 |
| JP | 10051402 A | 2/1998 |
| JP | 10084324 | 3/1998 |
| JP | 10209956 A | 8/1998 |
| JP | 10303794 A | 11/1998 |
| JP | 10327126 | 12/1998 |
| JP | 1141159 | 2/1999 |
| JP | 11074863 A | 3/1999 |
| JP | 11163823 A | 6/1999 |
| JP | 11205273 | 7/1999 |
| JP | 11252037 A | 9/1999 |
| JP | 11317723 A | 11/1999 |
| JP | 2991167 | 12/1999 |
| JP | 2000068975 A | 3/2000 |
| JP | 2000078105 | 3/2000 |
| JP | 2000092009 A | 3/2000 |
| JP | 2001044930 A | 2/2001 |
| JP | 200186045 | 3/2001 |
| JP | 2001103034 A | 4/2001 |
| JP | 2001186051 A | 7/2001 |
| JP | 2001510668 A | 7/2001 |
| JP | 2001217896 | 8/2001 |
| JP | 2001231074 | 8/2001 |
| JP | 2001237751 A | 8/2001 |
| JP | 200264879 | 2/2002 |
| JP | 2002504283 | 2/2002 |
| JP | 200277098 | 3/2002 |
| JP | 200277104 | 3/2002 |
| JP | 2002111627 | 4/2002 |
| JP | 2002118534 A | 4/2002 |
| JP | 2002510932 A | 4/2002 |
| JP | 2002514033 A | 5/2002 |
| JP | 2002164814 | 6/2002 |
| JP | 2002176379 A | 6/2002 |
| JP | 2002204217 | 7/2002 |
| JP | 2002232943 A | 8/2002 |
| JP | 2003504941 | 2/2003 |
| JP | 2003198442 A | 7/2003 |
| JP | 2004266586 | 9/2004 |
| JP | 2004297172 | 10/2004 |
| JP | 2006504336 A | 2/2006 |
| KR | 200011799 | 2/2000 |
| KR | 20010098861 | 11/2001 |
| KR | 1020020003370 | 1/2002 |
| RU | 2015281 C1 | 6/1994 |
| RU | 2111619 C1 | 5/1998 |
| RU | 2134489 | 8/1999 |
| RU | 2141168 C1 | 11/1999 |
| RU | 2146418 C1 | 3/2000 |
| RU | 2149509 | 5/2000 |
| RU | 2152132 | 6/2000 |
| RU | 2157592 | 10/2000 |
| RU | 2158479 C2 | 10/2000 |
| RU | 2168277 | 5/2001 |
| RU | 2168278 C2 | 5/2001 |
| RU | 2197781 C2 | 1/2003 |
| RU | 2201034 C2 | 3/2003 |
| RU | 2335852 C2 | 10/2008 |
| TW | 419912 | 1/2001 |
| TW | 545006 B | 8/2003 |
| TW | 583842 B | 4/2004 |
| TW | I263449 | 10/2006 |
| TW | I267251 B | 11/2006 |
| WO | 8607223 | 12/1986 |
| WO | 9307684 A1 | 4/1993 |
| WO | WO-9516319 A1 | 6/1995 |
| WO | 9521501 A1 | 8/1995 |
| WO | 9530316 A1 | 11/1995 |
| WO | 9532567 A1 | 11/1995 |
| WO | 9622662 | 7/1996 |
| WO | 9702667 | 1/1997 |
| WO | 9719525 A1 | 5/1997 |
| WO | 9736377 A1 | 10/1997 |
| WO | 9809381 A1 | 3/1998 |
| WO | 9809395 | 3/1998 |
| WO | 9824192 A1 | 6/1998 |
| WO | 9826523 | 6/1998 |
| WO | 9830047 A1 | 7/1998 |
| WO | 9857472 | 12/1998 |
| WO | 9903224 | 1/1999 |
| WO | 9914878 | 3/1999 |
| WO | 9916214 | 4/1999 |
| WO | 9929049 A2 | 6/1999 |
| WO | 9944379 A1 | 9/1999 |
| WO | 9952224 A1 | 10/1999 |
| WO | 9957820 | 11/1999 |
| WO | 0011823 A1 | 3/2000 |
| WO | 0036764 A2 | 6/2000 |
| WO | 0105067 A1 | 1/2001 |
| WO | 0126269 A1 | 4/2001 |
| WO | 0163775 A2 | 8/2001 |
| WO | 0169801 | 9/2001 |
| WO | 0171928 A2 | 9/2001 |
| WO | 0180510 A1 | 10/2001 |
| WO | 0195531 A2 | 12/2001 |
| WO | 0201732 A2 | 1/2002 |
| WO | 0203557 A1 | 1/2002 |
| WO | WO-0205506 | 1/2002 |
| WO | 0215433 A1 | 2/2002 |
| WO | 0225853 A2 | 3/2002 |
| WO | 02069523 A1 | 9/2002 |
| WO | 02073869 A1 | 9/2002 |
| WO | 02082689 A2 | 10/2002 |
| WO | 02088656 | 11/2002 |
| WO | 03010984 A1 | 2/2003 |
| WO | 03010994 A1 | 2/2003 |
| WO | 03019984 A1 | 3/2003 |
| WO | 03028153 | 4/2003 |
| WO | 03034646 A2 | 4/2003 |
| WO | 03047140 A1 | 6/2003 |

OTHER PUBLICATIONS

3GPP2 TIA/EIA/IS-2000.2-A, "Physical Layer Standard for cdma2000: Standards for Spread Spectrum Systems," (Mar. 2000), Telecommunications Industry Association, pp. 1-446.
3rd Generation Partnership Project ; Technical Specification Group

(56) References Cited

OTHER PUBLICATIONS

Radio Access Network; Radio Resource Control (RRC); Protocol Specifiation (Release 5 ), 3GPP Standard; 3GPP TS 25.331, 3rd Generation Partnership Project (3GPP), Mobile Competence Centre ; 650, Route Des Lucioles ; F-06921 Sophia-Antipolis Cedex; France, No. V5.2.0, Sep. 1, 2002, pp. 1-938, XP050367950, pp. 124, 358-p. 370.

"3rd Generation Partnership Project ; Technical Specification Group Radio Access 6-18, Network; Physical channels and mapping of 21-24 transport channels onto physical channels (TDD) (Release 5 )", 3GPP Standard; 3GPP TS 25.221, 3rd Generation Partnership Project (3GPP), Mobile Competence Centre ; 650, Route Des Lucioles ; F-06921 Sophia-Antipolis Cedex ; France, No. V5.2.0, Sep. 1, 2002, pp. 1-97, XP050366967.

Alamouti, S.M., "A Simple Transmit Diversity Technique for Wireless Communications," IEEE Journal on Select Areas in Communications, vol. 16, No. 8, Oct. 1998, pp. 1451-1458.

Bingham J.A.C., "Multicarrier modulation for data transmission: An idea whose time has come," Communications Magazine, IEEE, vol. 28, Issue 5, pp. 5-14 (May 1990).

Catreux S., et al., "Simulation results for an interference-limited multiple input multiple output cellular system"., Global Telecommmunications letters . IEEE: U.S.A. Nov. 2000. vol. 4(11), pp. 334-336.

Chen, K.C. et al., "Novel Space-Time Processing of DS/CDMA Multipath Signal," IEEE 49th, Vehicular Technology Conference, Houston, Texas, May 16-20, 1999, pp. 1809-1813.

Choi, R. et al., "MIMO Transmit Optimization for Wireless Communication Systems," Proceedings of the First IEEE International workshops on Electronic Design, pp. 1-6, Piscataway, New Jersey, Jan. 29-31, 2002.

Chung, J. et al: "Multiple antenna systems for 802.16 systems." IEEE 802.16 Broadband Wireless Access Working Group <http://ieee802.org/I6>, IEEE 802.16abc-01/31, Sep. 7, 2001, pp. 1-5.

Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.

Co-pending U.S. Appl. No. 07/624,118, filed Dec. 7, 1990.
Co-pending U.S. Appl. No. 08/118,473, filed Sep. 8, 1993.
Co-pending U.S. Appl. No. 60/421,309, filed Oct. 25, 2002.
Co-pending U.S. Appl. No. 60/421,428, filed Oct. 25, 2002.

Deneire, Luc, et al.: "A Low Complexity ML Channel Estimator for OFDM," Proc IEEE ICC (Jun. 2001), pp. 1461-1465.

Diggavi, S. et al., "Intercarrier interference in MIMO OFDM," IEEE International Conference on Communications, (Aug. 2002), vol. 1, pp. 485-489, doi: 10.1109/ICC.2002.996901.

ETSI TS 101 761-1 v1.3.1, "Broadband Radio Access Networks (BRAN); Hiperlan Type 2; Data Link Control (DLC) Layer; Part 1: Basic Data Transport Functions," ETSI Standards, European Telecommunications Standards Institute BR (V131), pp. 1-88 (Dec. 2001).

European Search Report—EP11155678—Search Authority—Hague—Dec. 11, 2012.

Fujii, M.: "Pseudo-Orthogonal Multibeam-Time Transmit Diversity for OFDM-CDMA" pp. 222-226 (2002).

G. Bauch, J. Hagenauer, "Smart Versus Dumb Antennas—Capacities and FEC Performance," IEEE Communications Letters, vol. 6, No. 2, pp. 55-57, Feb. 2002.

Gao, J. et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, (Sep. 24-28, 2002), IEEE Vehicular Technology Conference, pp. 199-203.

Gore, D. A., et al.: "Selecting an optimal set of transmit antennas for a low rank matrix channel," 2000 IEEE International Conference on Acoustics, Speech, and Signal Processing. Proceedings. (ICASSP). Istanbul, Turkey, June 5-9, 2000, New York, NY; IEEE, US, vol. 5 of 6, (Jun. 5, 2000), pp. 2785-2788, XP001035763, abstract.

Grunheid, R. et al., "Adaptive Modulation and Multiple Access for the OFDM Transmission Technique," Wireless Personal Communications 13: May 13, 2000, 2000 Kluwer Academic Publishers, pp. 4-13, XP000894156.

Harada H., et al., "An OFDM-Based Wireless ATM, Transmission System Assisted by a Cyclically ExtendedPN Sequence for Future Broad-BandMobile Multimedia Communications", IEEE Transactions on Vehicular Technology, IEEE Service Center, Piscataway, NJ, US, vol. 50, No. 6, Nov. 1, 2001, XP011064321, ISSN: 0018-9545.

Hassibi, B. et al., "High Rate Codes That are Linear in Space and Time," LUCENT Technologies, 2002, pp. 1-55.

Haustein, T. et al.: "Performance of MIMO Systems with Channel Inversion," IEEE 55th Vehicular Technology Conference, Birmingham, Alabama, May 6-9, 2002, pp. 35-39.

Hayashi, K. et al.: "A New Spatio-Temporal Equalization Method Based on Estimated Channel Response," Sep. 2001, IEEE Transactions on Vehicular Technology, vol. 50, No. 5, pp. 1250-1259.

Heath et al., "Multiuser diversity for MIMO wireless systems with linear receivers", Conference Record of the 35th Asilomar Conference on Signals, Systems, & Computers, Nov. 4, 2001, pp. 1194-1199, vol. 2, IEEE, XP010582229, DOI: 10.1109/ACSSC.2001.987680, ISBN: 978-0-7803-7147-7.

Hong, D. K. et al.: "Robust Frequency Offset Estimation for Pilot Symbol Assisted Packet CDMA with MIMO Antenna Systems," IEEE Communications Letters, vol. 6, No. 6, pp. 262-264, XP-001133262 (Jun. 2002).

IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.

International Search Report for PCT Application No. PCT-US03-034515 International Search Authority European Patent Office filed on Jun. 17, 2004.

Iserte, P., et al., "Joint beamforming strategies in OFDM-MIMO systems," Acoustics, Speech, and Signal Processing, 1993. ICASSP-93., 1993 IEEE International Conference on , vol. 3, sections 2-3, Apr. 27-30, 1993, doi: 10.1109/ICASSP.2002.1005279.

Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.

Jongren, G. et al.: "Utilizing Quantized Feedback Information in Orthogonal Space-Time Block Coding," 2000 IEEE Global Telecommunications Conference, 2(4): 995-999, Nov. 27, 2000.

Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.

Kousa M, et al., "Multichannel Adaptive System", IEEE Proceedings I. Solid-State & Electron Devices, Institution of Electrical Engineers. Stevenage, GB, vol. 140, No. 5, Part 1, Oct. 1, 1993, pp. 357-364, XP000403498, ISSN: 0956-3776.

Le Goff, S. et al: "Turbo-codes and high spectral efficiency modulation," IEEE International Conference on Communications, 1994. ICC "94, Supercomm/ICC "94, Conference Record, 'Serving Humanity Through Communications.' pp. 645-649, vol. 2, May 1-5, 1994, XP010126658, doi: 10.1109/ICC.1994.368804.

Lebrun G., et al., "MIMO transmission over a time varying TDD channel using SVD," Electronics Letters, 2001, vol. 37, pp. 1363-1364.

Li, Lihua, et al., "A practical space-frequency block coded OFDM scheme for fast fading broadband channels," 2002. The 13th IEEE International Symposium on Personal, Indoor and Mobile Radio communications, vol. 1, Sep. 15-18, 2002.pp. 212-216 vol. 1.

Li, Ye et. al., "Simplified Channel Estimation for OFDM Systems with Multiple Transmit Antennas," IEEE Transactions on Wireless Communications, Jan. 2002, vol. 1, No. 1, pp. 67-75.

Louvigne J.C., et al., "Experimental study of a real-time calibration procedure of a CDMA/TDD multiple antenna terminal," IEEE Antennas and Propagation Society International Symposium, 2002 Digest.Aps.San Antonio, TX, Jun. 16-21, 2002,vol. 2, Jun. 16, 2002, pp. 644-647, XP010591780, DOI: 10.1109/Aps.2002.1016729, ISBN: 978-0-7803-7330-3.

(56) References Cited

OTHER PUBLICATIONS

Miyashita, K. et al: "High data-rate transmission with eigenbeam-space division multiplexing (E-SDM) in a MIMO channel," VTC 2002-Fall. 2002 IEEE 56th. Vehicular Technology Conference Proceedings. Vancouver, Canada, Sep. 24-28, 2002, IEEE Vehicular Technology Conference, New York, NY: IEEE, US, vol. vol. 1 of 4. Conf. 56, (Sep. 24, 2002), pp. 1302-1306, XP010608639.

Nogueroles R., et al., "Performance of a random OFDMA system for mobile communications", Broadband Communications, 1998. Accessing, Transmission, Networking. Proceedings. 1998 International Zurich Seminar on Zurich, Switzerland Feb. 17-19, 1998, New York, NY, USA, IEEE, US, Feb. 17, 1998, pp. 37-43, XP010277032 , DOI : 10.1109/IZSBC.1998.670242 ISBN: 978-0-7803-3893-7, p. 1-p. 2.

Pautler, J. et al.: "On Application of Multiple-Input Multiple-Output Antennas to CDMA Cellular Systems," IEEE 54th Vehicular Technology Conference Proceedings, Atlantic City, New Jersey, Oct. 7-11, 2001, pp. 1508-1512.

Sakaguchi et al, "Comprehensive Calibration for MIMO System", International Symposium on Wireless Personal Multimedia Communications, IEEE, vol. 2, Oct. 27, 2002, pp. 440-443.

Sampath et al., "A Fourth-Generation MIMO-OFDM Broadband Wireless System: Design, Performance and Field Trial Results", IEEE Communications Magazine, Sep. 1, 2002, pp. 143-149, vol. 40, No. 9, IEEE Service Center, XP011092922, ISSN: 0163-6804, DOI: 10.1109/MCOM.2002.1031841.

Sampath, H., et al., "Joint transmit and receive optimization for high data rate wireless communication using multiple antennas," Signals, Systems, and Computers, 1999. Conference Record of the Thirty-Third Asilomar Conference, Oct. 24, 1999, XP010373976, pp. 215-219, IEEE, Piscataway, NJ, US.

Song, Bong-Gee et al., "Prefilter design using the singular value decomposition for MIMO equalization," 1996 Conference Record of the Thirtieth Asilomar Conference on Signals, Systems and Computers, vol. 1, pp. 34-38, Nov. 3-6, 1996, XP010231388, DOI : 10.1109/ACSSC.1996.600812, p. 35, col. 2, paragraph 4 through p. 36, col. 1.

Taiwanese Search Report for Application No. 092129800, TIPO, filed on Apr. 6, 2010.

Tarighat, A. et al. "Performance Analysis of Different Algorithms for cdma2000 Antenna Array System and a New Multi User Beamforming (MUB) Algorithm", Wireless Communications and Networking Conference, vol. 1, pp. 409-414, Sep. 23, 2000.

The Authoritative Dictionary of IEEE Standards Terms, Seventh Edition, IEEE Press: New York (Dec. 2000), p. 902.

Theon, S. et al.: "Improved Adaptive Downlink for OFDM/SDMA-Based Wireless Networks," IEEE VTS 53rd Vehicular Technology Conference, pp. 707-711, Rhodes, Greece, May 6-9, 2001.

Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinki, Finland, Jun. 11-14, 2001.

Van Zelst, A. et al.: "Space Division Multiplexing (SDM) for OFDM Systems," IEEE 51st Vehicular Technology Conference Proceedings, pp. 1070-1074, Tokyo, Japan, May 15-18, 2000.

Varanasi M.K, et al., "Optimum decision feedback multiuser equalization with successive decoding achieves the total capacity of the Gaussian multiple-access channel", Signals, Systems & Computers, 1997. Conference Record of the Thirty-First Asilomar Conference on Pacific Grove, CA, USA Nov. 2-5, 1997, Los Alamitos, CA, USA, IEEE Comput. Soc, US, vol. 2, Nov. 2, 1997, pp. 1405-1409 , XP010280667, DOI: 10.1109/ACSSC.1997 . 679134 ISBN : 978-0-8186-8316-9 * pp. 1,3,5; figures 1,3 *.

Vook, F. W. et al., "Adaptive antennas for OFDM", Vehicular Technology Conference, vol. 1, May 18-21, 1998, pp. 606-610, XP010287858, New York, NY, USA, IEEE, US DOI: 10.1109/VETEC.1998.686646 ISBN: 978-0-7803-4320-7.

Wales, S.W. "A mimo technique within the UTRA TDD standard," MIMO: Communications Systems from Concept to Implementations (Ref. No. 2001/175), IEE Seminar on, (Dec. 12, 2001), pp. 1-8., London, UK.

Warner, W. et al.: "OFDM/FM Frame Synchronization for Mobile Radio Data Communication", IEEE Transactions on Vehicular Technology, Aug. 1993, vol. 42, No. 3, pp. 302-313.

Wolniansky P.W., et al., "V-BLAST: An architecture for realizing very high data rates over the rich-scattering wireless channel," Signals, Systems, and Electronics, 1998. ISSSE 98. 1998 URSI International Symposium, pp. 295-300, (Sep. 29-Oct. 2, 1998), doi: 10.1109/ISSSE.1998.738086.

Wong, et al., "Multiuser OFDM With Adaptive Subcarrier, Bit, and Power Allocation," Oct. 1999, IEEE Journal on Selected Areas in Communications, vol. 17, No. 10, pp. 1747-1758.

Wong K. K., et al., "Optimizing time and space MIMO antenna system for frequency selective fading channels," IEEE Journal on Selected Areas in Communications, vol. 19, No. 7, Jul. 2001, Sections II and III and V, 1396, pp. 1395-1407.

Wyglinski, Alexander. "Physical Layer Loading Algorithms for Indoor Wireless Multicarrier Systems," Thesis Paper, McGill University, Montreal, Canada, Nov. 2004, p. 109.

Yamamura, T et al., "High Mobility OFDM transmission system by a new channel estimation and ISI cancellation scheme using characteristics of pilot symbol inserted OFDM signal"., Vehicular Technology Conference, vol. 1, Sep. 19, 1999-Sep. 22, 1999, pp. 319-323, XP010352958 IEEE, Piscataway, NJ, USA, ISBN: 0-7803-5435-4.

Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.

Editor: 3GPP Draft; 3rd Generation Partnership Project (3GPP), Technical Specification Group (TSG) Radio Access Network (RAN); Working Group 4(WG4); base Station conformance and testing, TS 25.141 V0.1.1 (May 1999), R4-99349, Mobile Competence Centre; 650, Route Des Lucioles; F-06921 Sophia-Antipolis Cedex; France, vol. RAN WG4, no.Miami; Oct. 24, 2001, XP050166323.

EPO Communication pursuant to Article 94(3) EPC issued by the European Patent Orffice for Application No. 10174932.3 dated Aug. 1, 2013.

EPO Communication pursuant to Article 94(3) EPC issued by the European Patent Orffice for Application No. 10174932.3 dated Jul. 30, 2013.

Lal D et al: "A novel MAC layer protocol for space division multiple access in wireless ad hoc networks", Computer Communications and Networks, 2002 Proceedings, Eleventh International Conference on Oct. 14, 2002, pp. 614-619.

Technical Search Report issued by the Taiwan Patent Office for TW Application No. 098143050, dated Aug. 2, 2013.

Office Action dated Aug. 13, 2008 for Australian Application Serial No. 2004223374, 2 pages.

Office Action dated Jun. 27, 2008 for Chinese Application Serial No. 200480011307.6, 3 pages.

* cited by examiner

CHANNEL CALIBRATION FOR A TIME DIVISION DUPLEXED COMMUNICATION SYSTEM

PRIORITY CLAIM & CROSS REFERENCE TO RELATED APPLICATIONS

This application is a continuation of co-pending U.S. patent application Ser. No. 10/693,169, entitled "CHANNEL CALIBRATION FOR A TIME DIVISION DUPLEXED COMMUNICATION SYSTEM," filed Oct. 23, 2003, and issuing as U.S. Pat. No. 8,134,976, on 13 Mar. 2012. This patent application also claims priority to two US Provisional Applications by virtue of the priority-continuation claim to U.S. Ser. No. 10/693, 169: (a) U.S. Provisional Application Ser. No. 60/421,462, entitled, "Channel Calibration for a Time Division Duplexed Communication System", and (b) U.S. Provisional Application Ser. No. 60/421,309, entitled, "MIMO WLAN System," both of which were filed on Oct. 25, 2002. All of above mentioned applications and patents are assigned to the assignee of the present application, and are incorporated herein by reference for all purposes and as if fully set forth below in their entireties.

TECHNICAL FIELD

The present invention relates generally to communication, and more specifically to techniques for calibrating downlink and uplink channel responses in a time division duplexed (TDD) communication system.

BACKGROUND

In a wireless communication system, data transmission between an access point and a user terminal occurs over a wireless channel. Depending on the system design, the same or different frequency bands may be used for the downlink and uplink. The downlink (or forward link) refers to transmission from the access point to the user terminal, and the uplink (or reverse link) refers to transmission from the user terminal to the access point. If two frequency bands are available, then the downlink and uplink may be transmitted on separate frequency bands using frequency division duplexing (FDD). If only one frequency band is available, then the downlink and uplink may share the same frequency band using time division duplexing (TDD).

To achieve high performance, it is often necessary to know the frequency response of the wireless channel. For example, the response of the downlink channel may be needed by the access point to perform spatial processing (described below) for downlink data transmission to the user terminal. The downlink channel response may be estimated by the user terminal based on a pilot transmitted by the access point. The user terminal may then send the channel estimate back to the access point for its use. For this channel estimation scheme, a pilot needs to be transmitted on the downlink and additional delays and resources are incurred to send the channel estimate back to the access point.

For a TDD system with a shared frequency band, the downlink and uplink channel responses may be assumed to be reciprocal of one another. That is, if $\underline{H}$ represents a channel response matrix from antenna array A to antenna array B, then a reciprocal channel implies that the coupling from array B to array A is given by $\underline{H}^T$, where $\underline{M}^T$ denotes the transpose of matrix $\underline{M}$. Thus, for a TDD system, the channel response for one link may be estimated based on a pilot sent on the other link. For example, the uplink channel response may be estimated based on an uplink pilot, and the transpose of the uplink channel response estimate may be used as an estimate of the downlink channel response.

However, the frequency responses of the transmit and receive chains at the access point are typically different from the frequency responses of the transmit and receive chains at the user terminal. In particular, the frequency responses of the transmit/receive chains used for uplink transmission may be different from the frequency responses of the transmit/receive chains used for downlink transmission. The "effective" downlink channel response (i.e., including the transmit/receive chains) would then be different from the reciprocal of the effective uplink channel response due to differences in the transmit/receive chains (i.e., the effective channel responses are not reciprocal). If the reciprocal of the channel response estimate obtained for one link is used for spatial processing on the other link, then any difference in the frequency responses of the transmit/receive chains would represent error that, if not determined and accounted for, may degrade performance.

There is, therefore, a need in the art for techniques to calibrate the downlink and uplink channels in a TDD communication system.

SUMMARY

Techniques are provided herein to calibrate the downlink and uplink channels to account for differences in the frequency responses of the transmit and receive chains at the access point and user terminal. After calibration, an estimate of the channel response obtained for one link may be used to obtain an estimate of the channel response for the other link. This can then simplify the channel estimation and spatial processing.

In one embodiment, a method is provided for calibrating the downlink and uplink channels in a wireless TDD multiple-input multiple-output (MIMO) communication system. In accordance with the method, a pilot is transmitted on the uplink channel and used to derive an estimate of the uplink channel response. A pilot is also transmitted on the downlink channel and used to derive an estimate of the downlink channel response. Two sets of correction factors are then determined based on the estimates of the downlink and uplink channel responses. A calibrated downlink channel is formed by using a first set of correction factors for the downlink channel, and a calibrated uplink channel is formed by using a second set of correction factors for the uplink channel. The appropriate correction factors will be used at the respective transmitter for the downlink and uplink channels. The responses of the calibrated downlink and uplink channels are approximately reciprocal due to the two sets of correction factors. The first and second sets of correction factors may be determined using a matrix-ratio computation or a minimum mean square error (MMSE) computation, as described below.

The calibration may be performed in real-time based on over-the-air transmission. Each user terminal in the system may derive the second set of correction factors for its own use. The first set of correction factors for the access point may be derived by multiple user terminals. For an orthogonal frequency division multiplexing (OFDM) system, the calibration may be performed for a first set of subbands to obtain two sets of correction factors for each subband in the set. Correction factors for other "uncalibrated" subbands may be interpolated based on the correction factors obtained for the "calibrated" subbands.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The calibration techniques described herein may be used for various wireless communication systems. Moreover, these techniques may be used for single-input single-output (SISO) systems, multiple-input single-output (MISO) systems, single-input multiple-output (SIMO) systems, and multiple-input multiple-output (MIMO) systems.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel or an eigenmode of the MIMO channel and corresponds to a dimension. The MIMO system can provide improved performance (e.g., increased transmission capacity) if the additional dimensionalities created by the multiple transmit and receive antennas are utilized. This typically requires an accurate estimate of the channel response between the transmitter and receiver.

Figure 1:
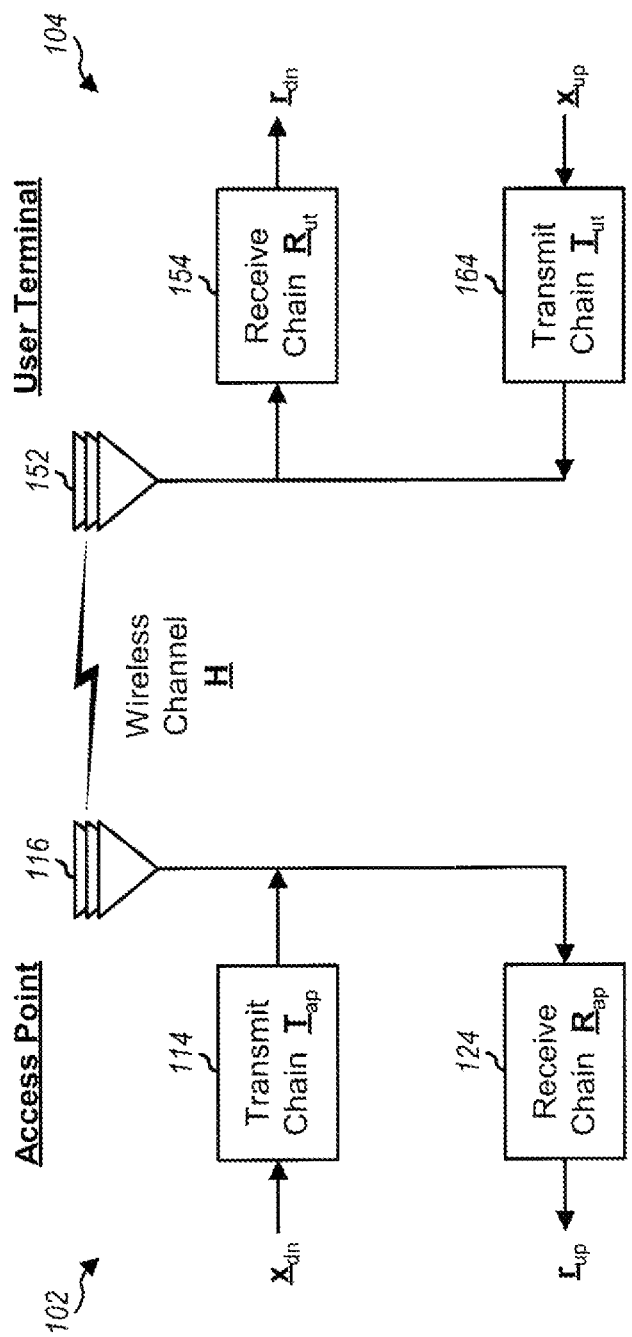
FIG. 1 shows the transmit and receive chains at an access point and a user terminal in a MIMO system.

FIG. 1 shows a block diagram of the transmit and receive chains at an access point 102 and a user terminal 104 in a MIMO system. For this system, the downlink and uplink share the same frequency band in a time division duplexed manner.

For the downlink, at access point 102, symbols (denoted by a "transmit" vector $\underline{x}_{dn}$) are processed by a transmit chain (TMTR) 114 and transmitted from $N_{ap}$ antennas 116 over a wireless channel. At user terminal 104, the downlink signals are received by $N_{ut}$ antennas 152 and processed by a receive chain (RCVR) 154 to provide received symbols (denoted by a "receive" vector $\underline{r}_{dn}$). The processing by transmit chain 114 typically includes digital-to-analog conversion, amplification, filtering, frequency upconversion, and so on. The processing by receive chain 154 typically includes frequency downconversion, amplification, filtering, analog-to-digital conversion, and so on.

For the uplink, at user terminal 104, symbols (denoted by transmit vector $\underline{x}_{up}$) are processed by a transmit chain 164 and transmitted from $N_{ut}$ antennas 152 over the wireless channel. At access point 102, the uplink signals are received by $N_{ap}$ antennas 116 and processed by a receive chain 124 to provide received symbols (denoted by receive vector $\underline{r}_{up}$).

For the downlink, the receive vector at the user terminal may be expressed as:

$$\underline{r}_{dn} = \underline{R}_{ut} \underline{H} \underline{T}_{ap} \underline{x}_{dn}, \qquad \text{Eq (1)}$$

where $\underline{x}_{dn}$ is the transmit vector with $N_{ap}$ entries for the symbols transmitted from the $N_{ap}$ antennas at the access point;

$\underline{r}_{dn}$ is the receive vector with $N_{ut}$ entries for the symbols received on the $N_{ut}$ antennas at the user terminal;

$\underline{T}_{ap}$ is an $N_{ap} \times N_{ap}$ diagonal matrix with entries for the complex gains associated with the transmit chain for the $N_{ap}$ antennas at the access point;

$\underline{R}_{ut}$ is an $N_{ut} \times N_{ut}$ diagonal matrix with entries for the complex gains associated with the receive chain for the $N_{ut}$ antennas at the user terminal; and $\underline{H}$ is an $N_{ut} \times N_{ap}$ channel response matrix for the downlink. The responses of the transmit/receive chains and the wireless channel are typically a function of frequency. For simplicity, a flat-fading channel (i.e., with a flat frequency response) is assumed.

For the uplink, the receive vector at the access point may be expressed as:

$$\underline{r}_{up} = \underline{R}_{ap} \underline{H}^T \underline{T}_{ut} \underline{x}_{up}, \qquad \text{Eq (2)}$$

where $\underline{x}_{up}$ is the transmit vector for the symbols transmitted from the $N_{ut}$ antennas at the user terminal;

$\underline{r}_{up}$ is the receive vector for the symbols received on the $N_{ap}$ antennas at the access point;

$\underline{T}_{ut}$ is an $N_{ut} \times N_{ut}$ diagonal matrix with entries for the complex gains associated with the transmit chain for the $N_{ut}$ antennas at the user terminal;

$\underline{R}_{ap}$ is an $N_{ap} \times N_{ap}$ diagonal matrix with entries for the complex gains associated with the receive chain for the $N_{ap}$ antennas at the access point; and $\underline{H}^T$ is an $N_{ap} \times N_{ut}$ channel response matrix for the uplink.

For a TDD system, since the downlink and uplink share the same frequency band, a high degree of correlation normally exists between the downlink and uplink channel responses. Thus, the downlink and uplink channel response matrices may be assumed to be reciprocal (i.e., transposes) of each other and denoted H and $H^T$, respectively, as shown in equations (1) and (2). However, the responses of the transmit/receive chains at the access point are typically not equal to the responses of the transmit/receive chains at the user terminal. The differences then result in the following inequality $\underline{R}_{ap} \underline{H}^T \underline{T}_{ut} \neq (\underline{R}_{ut} \underline{H} \underline{T}_{ap})^T$.

From equations (1) and (2), the "effective" downlink and uplink channel responses, $\underline{H}_{dn}$ and $\underline{H}_{up}$, which include the responses of the applicable transmit and receive chains, may be expressed as:

$$\underline{H}_{dn} = \underline{R}_{ut} \underline{H} \underline{T}_{ap} \text{ and } \underline{H}_{up} = \underline{R}_{ap} \underline{H}^T \underline{T}_{ut}. \qquad \text{Eq (3)}$$

Combining the two equations in equation set (3), the following relationship may be obtained:

$$\underline{R}_{ut}^{-1} \underline{H}_{dn} \underline{T}_{ap}^{-1} = (\underline{R}_{ap}^{-1} \underline{H}_{up} \underline{T}_{ut}^{-1})^T = \underline{T}_{ut}^{-1} \underline{H}_{up}^T \underline{R}_{ap}^{-1}. \qquad \text{Eq (4)}$$

Rearranging equation (4), the following is obtained:

$$\underline{H}_{up}^T = \underline{T}_{ut} \underline{R}_{ut}^{-1} \underline{H}_{dn} \underline{T}_{ap}^{-1} \underline{R}_{ap} = \underline{K}_{ut}^{-1} \underline{H}_{dn} \underline{K}_{ap}$$

or $$\underline{H}_{up} = (\underline{K}_{ut}^{-1} \underline{H}_{dn} \underline{K}_{ap})^T, \qquad \text{Eq (5)}$$

where $\underline{K}_{ut} = \underline{T}_{ut}^{-1} \underline{R}_{ut}$ and $\underline{K}_{ap} = \underline{T}_{ap}^{-1} \underline{R}_{ap}$. Equation (5) may also be expressed as:

$$\underline{H}_{up} \underline{K}_{ut} = (\underline{H}_{dn} \underline{K}_{ap})^T, \qquad \text{Eq (6)}$$

The left-hand side of equation (6) represents the calibrated channel response on the uplink, and the right-hand side represents the transpose of the calibrated channel response on the downlink. The application of the diagonal matrices, $\underline{K}_{ut}$ and $\underline{K}_{ap}$, to the effective downlink and uplink channel responses, as shown in equation (6), allows the calibrated channel responses for the downlink and uplink to be expressed as transposes of each other. The ($N_{ap} \times N_{ap}$) diagonal matrix $\underline{K}_{ap}$ for the access point is the ratio of the receive chain response $\underline{R}_{ap}$ to the transmit chain response $$\underline{T}_{ap} \left( \text{i.e.,} \ \underline{K}_{ap} = \frac{\underline{R}_{ap}}{\underline{T}_{ap}} \right),$$

where the ratio is taken element-by-element. Similarly, the ($N_{ut} \times N_{ut}$) diagonal matrix $\underline{K}_{ut}$ for the user terminal is the ratio of the receive chain response $\underline{R}_{ut}$ to the transmit chain response $\underline{T}_{ut}$.

The matrices $\underline{K}_{ap}$ and $\underline{K}_{ut}$ include values that can account for differences in the transmit/receive chains at the access point and user terminal. This would then allow the channel response for one link to be expressed by the channel response for the other link, as shown in equation (6).

Calibration may be performed to determine the matrices $\underline{K}_{ap}$ and $\underline{K}_{ut}$. Typically, the true channel response H and the transmit/receive chain responses are not known nor can they be exactly or easily ascertained. Instead, the effective downlink and uplink channel responses, $\underline{H}_{dn}$ and $\underline{H}_{up}$, may be estimated based on pilots sent on the downlink and uplink, respectively, as described below. Estimates of the matrices $\underline{K}_{ap}$ and $\underline{K}_{ut}$, which are referred to as correction matrices $\underline{\hat{K}}_{ap}$ and $\underline{\hat{K}}_{ut}$, may then be derived based on the downlink and uplink channel response estimates, $\underline{\hat{H}}_{dn}$ and $\underline{\hat{H}}_{up}$, as described below. The matrices $\underline{\hat{K}}_{ap}$ and $\underline{\hat{K}}_{ut}$ include correction factors that can account for differences in the transmit/receive chains at the access point and user terminal.

Figure 2:
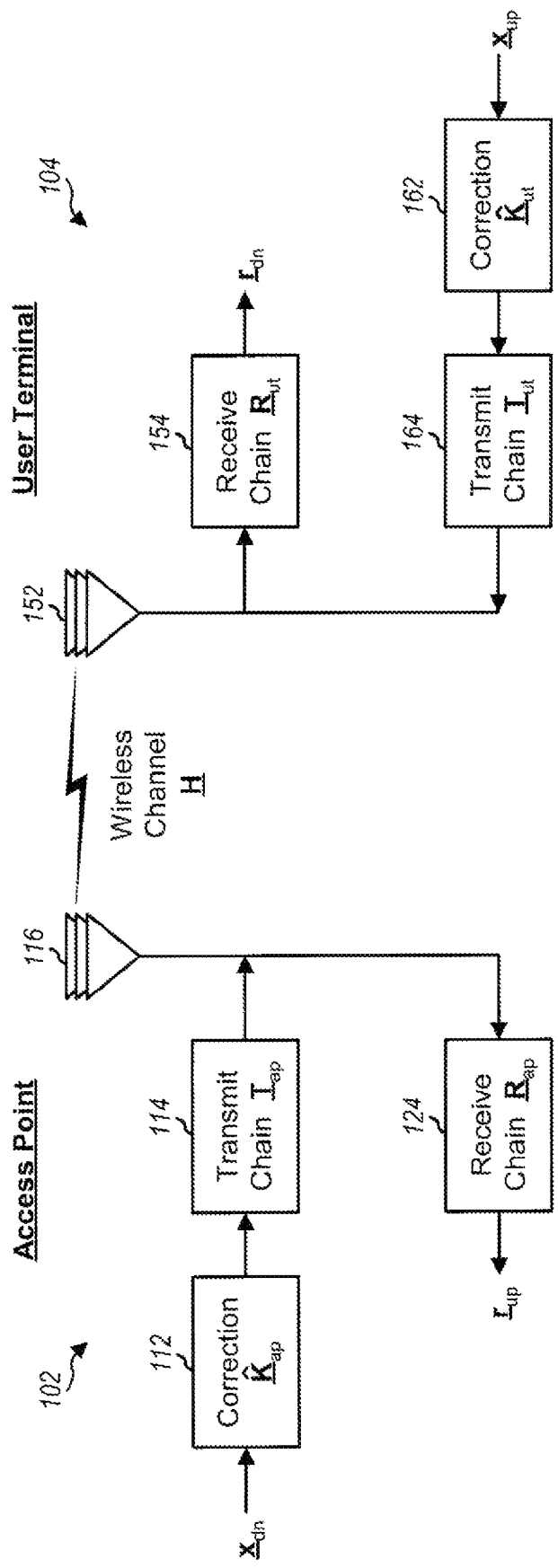
FIG. 2 illustrates the application of correction factors to account for differences in the transmit/receive chains at the access point and user terminal.

FIG. 2 illustrates the application of the correction matrices $\underline{\hat{K}}_{ap}$ and $\underline{\hat{K}}_{ut}$ to account for differences in the transmit/receive chains at the access point and user terminal. On the downlink, the transmit vector $x_{dn}$ is first multiplied with the matrix $\underline{\hat{K}}_{ap}$ by a unit 112. The subsequent processing by transmit chain 114 and receive chain 154 for the downlink is the same as shown in FIG. 1. Similarly, on the uplink, the transmit vector $x_{up}$ is first multiplied with the matrix $\underline{\hat{K}}_{ut}$ by a unit 162. Again, the subsequent processing by transmit chain 164 and receive chain 124 for the uplink is the same as shown in FIG. 1.

The "calibrated" downlink and uplink channel responses observed by the user terminal and access point, respectively, may then be expressed as:

$$\underline{H}_{cdn} = \underline{H}_{dn} \underline{\hat{K}}_{ap} \ \text{and} \ \underline{H}_{cup} = \underline{H}_{up} \underline{\hat{K}}_{ut}, \qquad \text{Eq (7)}$$

where $\underline{H}_{cdn}^T$ and $\underline{H}_{cup}$ are estimates of the "true" calibrated channel response expressions in equation (6). Combining the two equations in equation set (7) using the expression in equation (6), it can be shown that $\underline{H}_{cup} \approx \underline{H}_{cdn}^T$. The accuracy of the relationship $\underline{H}_{cup} \approx \underline{H}_{cdn}^T$ is dependent on the accuracy of the matrices $\underline{\hat{K}}$ and $\underline{\hat{K}}_{ut}$, which in turn is typically dependent on the quality of the downlink and uplink channel response estimates, $\underline{\hat{H}}_{dn}$ and $\underline{\hat{H}}_{up}$.

As shown above, calibration may be performed in a TDD system to determine the differences in the responses of the transmit/receive chains at the access point and user terminal, and to account for the differences. Once the transmit/receive chains have been calibrated, a calibrated channel response estimate obtained for one link (e.g., $\underline{\hat{H}}_{cdn}$) may be used to determine an estimate of the calibrated channel response for the other link (e.g., $\underline{\hat{H}}_{cup}$).

The calibration techniques described herein may also be used for wireless communication systems that employ OFDM. OFDM effectively partitions the overall system bandwidth into a number of ($N_F$) orthogonal subbands, which are also referred to as frequency bins or subchannels. With OFDM, each subband is associated with a respective subcarrier upon which data may be modulated. For a MIMO system that utilizes OFDM (i.e., a MIMO-OFDM system), each subband of each eigenmode may be viewed as an independent transmission channel.

The calibration may be performed in various manners. For clarity, a specific calibration scheme is described below for a TDD MIMO-OFDM system. For this system, each subband of the wireless link may be assumed to be reciprocal.

Figure 3:
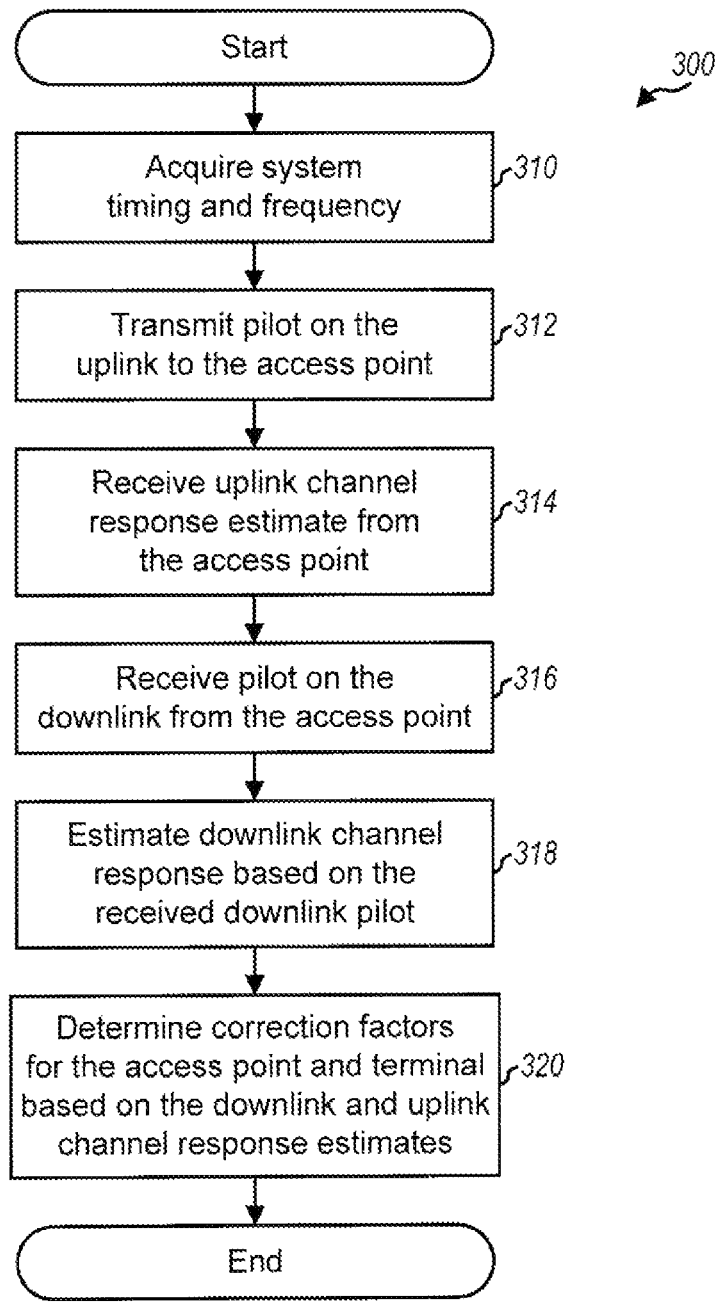
FIG. 3 shows a process for calibrating the downlink and uplink channel responses in a TDD MIMO-OFDM system.

FIG. 3 is a flow diagram of an embodiment of a process 300 for calibrating the downlink and uplink channel responses in the TDD MIMO-OFDM system. Initially, the user terminal acquires the timing and frequency of the access point using acquisition procedures defined for the system (step 310). The user terminal may then send a message to initiate calibration with the access point, or the calibration may be initiated by the access point. The calibration may be performed in parallel with registration/authentication of the user terminal by the access point (e.g., during call setup) and may also be performed whenever warranted.

The calibration may be performed for all subbands that may be used for data transmission (which are referred to as the "data" subbands). Subbands not used for data transmission (e.g., guard subbands) typically do not need to be calibrated. However, since the frequency responses of the transmit/receive chains at the access point and user terminal are typically flat over most of the band of interest, and since adjacent subbands are likely to be correlated, the calibration may be performed for only a subset of the data subbands. If fewer than all data subbands are calibrated, then the subbands to be calibrated (which are referred to as the "designated" subbands) may be signaled to the access point (e.g., in the message sent to initiate the calibration).

For the calibration, the user terminal transmits a MIMO pilot on the designated subbands to the access point (step 312). The generation of the MIMO pilot is described in detail below. The duration of the uplink MIMO pilot transmission may be dependent on the number of designated subbands. For example, 8 OFDM symbols may be sufficient if calibration is performed for four subbands, and more (e.g., 20) OFDM symbols may be needed for more subbands. The total transmit power is typically fixed, so if the MIMO pilot is transmitted on a small number of subbands, then higher amounts of transmit power may be used for each of these subbands and the SNR for each subband is high. Conversely, if the MIMO pilot is transmitted on a large number of subbands then smaller amounts of transmit power may be used for each subband and the SNR for each subband is worse. If the SNR of each subband is not sufficiently high, then more OFDM symbols may be sent for the MIMO pilot and integrated at the receiver to obtain a higher overall SNR for the subband.

The access point receives the uplink MIMO pilot and derives an estimate of the uplink channel response, $\underline{\hat{H}}_{up}(k)$, for each of the designated subbands, where k represents the subband index. Channel estimation based on the MIMO pilot is described below. The uplink channel response estimates are quantized and sent to the user terminal (step 314). The entries in each matrix $\underline{\hat{H}}_{up}(k)$ are complex channel gains between the $N_{ut}$ transmit and $N_{ap}$ receive antennas for the uplink for the k-th subband. The channel gains for all matrices may be scaled by a particular scaling factor, which is common across all designated subbands, to obtain the desired dynamic range. For example, the channel gains in each matrix $\hat{\underline{H}}_{up}(k)$ may be inversely scaled by the largest channel gain for all matrices $\hat{\underline{H}}_{up}(k)$ for the designated subbands so that the largest channel gain is one in magnitude. Since the goal of the calibration is to normalize the gain/phase difference between the downlink and uplink, the absolute channel gains are not important. If 12-bit complex values (i.e., with 12-bit inphase (I) and 12-bit quadrature (Q) components) are used for the channel gains, then the downlink channel response estimates may be sent to the user terminal in $3 \cdot N_{ut} \cdot N_{ap} \cdot N_{sb}$ bytes, where "3" is for the 24 total bits used to represent the I and Q components and $N_{sb}$ is the number of designated subbands.

The user terminal also receives a downlink MIMO pilot transmitted by the access point (step 316) and derives an estimate of the downlink channel response, $\hat{\underline{H}}_{dn}(k)$, for each of the designated subbands based on the received pilot (step 318). The user terminal then determines correction factors, $\hat{K}_{ap}(k)$ and $\hat{K}_{ut}(k)$, for each of the designated subbands based on the uplink and downlink channel response estimates, $\hat{\underline{H}}_{up}(k)$ and $\hat{\underline{H}}_{dn}(k)$ (step 320).

For the derivation of the correction factors, the downlink and uplink channel responses for each subband are assumed to be reciprocal, with gain/phase corrections to account for the differences in the transmit/receive chains at the access point and user terminal, as follows:

$$\underline{H}_{up}(k)\underline{K}_{ut}(k) = (\underline{H}_{dn}(k)\underline{K}_{ap}(k))^T, \text{ for } k \in K, \quad \text{Eq (8)}$$

where K represents a set with all data subbands. Since only estimates of the effective downlink and uplink channel responses are available for the designated subbands during calibration, equation (8) may be rewritten as:

$$\hat{\underline{H}}_{up}(k)\hat{\underline{K}}_{ut}(k) = (\hat{\underline{H}}_{dn}(k)\hat{\underline{K}}_{ap}(k))^T, \text{ for } k \in K', \quad \text{Eq (9)}$$

where K' represents a set with all designated subbands. A correction vector $\hat{\underline{k}}_{ut}(k)$ may be defined to include only the $N_{ut}$ diagonal elements of $\hat{\underline{K}}_{ut}(k)$. Similarly, a correction vector $\hat{\underline{k}}_{ap}(k)$ may be defined to include only the $N_{ap}$ diagonal elements of $\hat{\underline{K}}_{ap}(k)$.

The correction factors $\hat{K}_{ap}(k)$ and $\hat{K}_{ut}(k)$ may be derived from the channel estimates $\hat{\underline{H}}_{dn}(k)$ and $\hat{\underline{H}}_{up}(k)$ in various manners, including by a matrix-ratio computation and a minimum mean square error (MMSE) computation. Both of these computation methods are described in further detail below. Other computation methods may also be used, and this is within the scope of the invention.

A. Matrix-Ratio Computation

Figure 4:
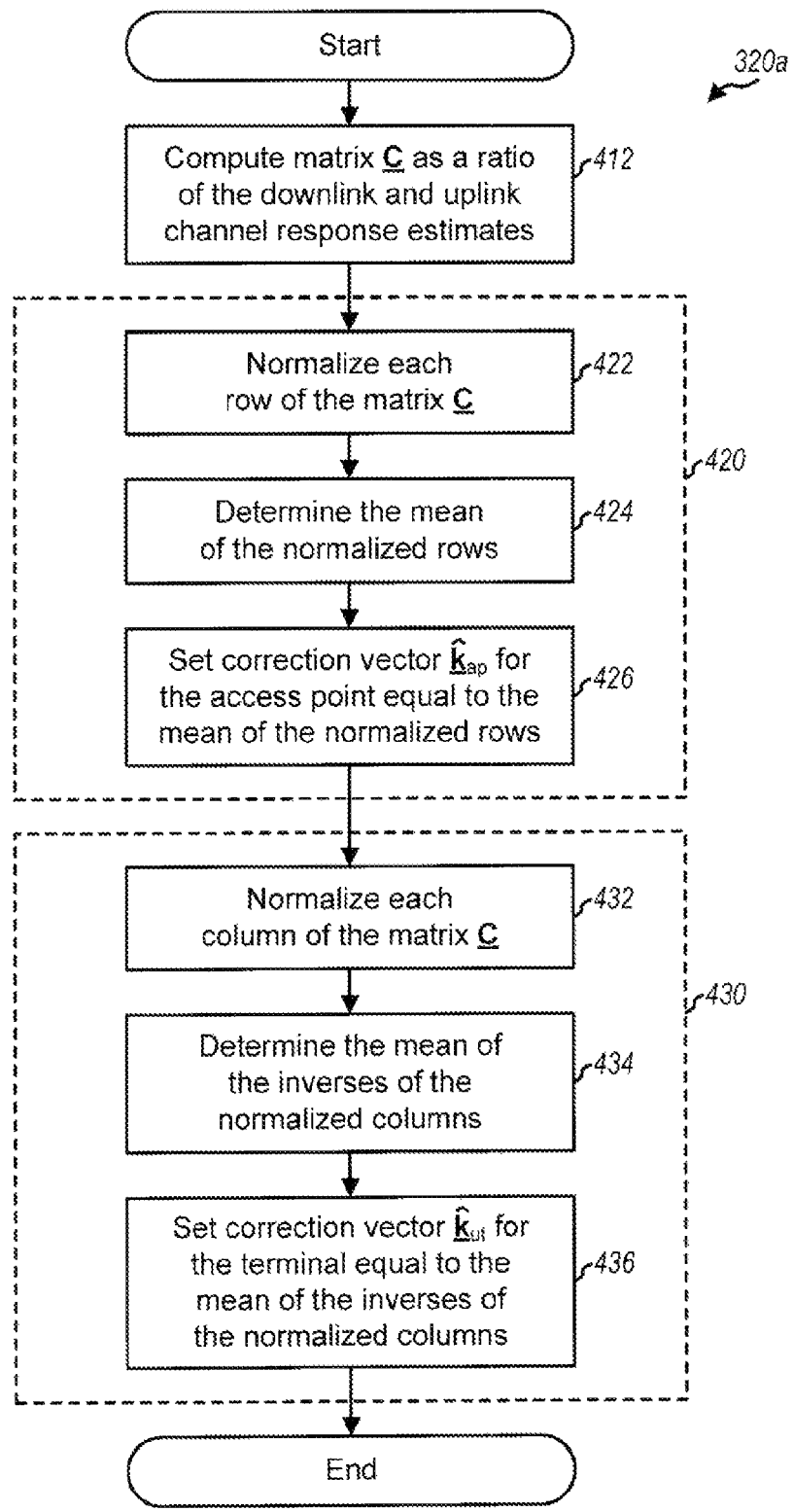
FIG. 4 shows a process for deriving estimates of the correction vectors from the downlink and uplink channel response estimates.

FIG. 4 is a flow diagram of an embodiment of a process 320a for deriving the correction vectors $\hat{\underline{k}}_{ut}(k)$ and $\hat{\underline{k}}_{ap}(k)$ from the downlink and uplink channel response estimates $\hat{\underline{H}}_{up}(k)$ and $\hat{\underline{H}}_{dn}(k)$ using matrix-ratio computation. Process 320a may be used for step 320 in FIG. 3.

Initially, an $(N_{ut} \times N_{ap})$ matrix $\underline{C}(k)$ is computed for each designated subband (step 412), as follows:

$$\underline{C}(k) = \frac{\hat{\underline{H}}_{up}^T(k)}{\hat{\underline{H}}_{dn}(k)}, \text{ for } k \in K', \quad \text{Eq (10)}$$

where the ratio is taken element-by-element. Each element of $\underline{C}(k)$ may thus be computed as:

$$c_{i,j}(k) = \frac{\hat{h}_{up\ i,j}(k)}{\hat{h}_{dn\ i,j}(k)}, \text{ for } i = \{1 \ldots N_{ut}\} \text{ and } \quad \text{Eq (11)}$$

$$j = \{1 \ldots N_{ap}\},$$

where $\hat{h}_{up\ i,j}(k)$ and $\hat{h}_{dn\ i,j}(k)$ are the (i,j)-th (row, column) element of $\hat{\underline{H}}_{up}^T(k)$ and $\hat{\underline{H}}_{dn}(k)$, respectively, and $c_{i,j}(k)$ is the (i,j)-th element of $\underline{C}(k)$.

In an embodiment, the correction vector for the access point, $\hat{\underline{k}}_{ap}(k)$, is defined to be equal to the mean of the normalized rows of $\underline{C}(k)$ and is derived by the steps in block 420. Each row of $\underline{C}(k)$ is first normalized by scaling each of the $N_{ap}$ elements in the row with the first element in the row (step 422). Thus, if $\underline{c}_i(k) = [c_{i,1}(k) \ldots c_{i,N_{ap}}(k)]$ is the i-th row of $\underline{C}(k)$, then the normalized row $\underline{\tilde{c}}_i(k)$ may be expressed as:

$$\underline{\tilde{c}}_i(k) = [c_{i,1}(k)/c_{i,1}(k) \ldots c_{i,j}(k)/c_{i,1}(k) \ldots c_{i,N_{ap}}(k)/c_{i,1}(k)]. \quad \text{Eq (12)}$$

The mean of the normalized rows is then determined as the sum of the $N_{ut}$ normalized rows divided by $N_{ut}$ (step 424). The correction vector $\hat{\underline{k}}_{ap}(k)$ is set equal to this mean (step 426), which may be expressed as:

$$\hat{\underline{k}}_{ap}(k) = \frac{1}{N_{ut}} \sum_{i=1}^{N_{ut}} \underline{\tilde{c}}_i(k), \text{ for } k \in K'. \quad \text{Eq (13)}$$

Because of the normalization, the first element of $\hat{\underline{k}}_{ap}(k)$ is unity.

In an embodiment, the correction vector for the user terminal, $\hat{\underline{k}}_{ut}(k)$, is defined to be equal to the mean of the inverses of the normalized columns of $\underline{C}(k)$ and is derived by the steps in block 430. The j-th column of $\underline{C}(k)$ is first normalized by scaling each element in the column with the j-th element of the vector $\hat{\underline{k}}_{ap}(k)$, which is denoted as $K_{ap,j,j}(k)$ (step 432). Thus, if $\underline{c}_j(k) = [c_{1,j}(k) \ldots c_{N_{ut},j}(k)]^T$ is the j-th column of $\underline{C}(k)$, then the normalized column $\underline{\check{c}}_j(k)$ may be expressed as:

$$\underline{\check{c}}_j(k) = [c_{1,j}(k)/K_{ap,j,j}(k) \ldots c_{i,j}(k)/K_{ap,j,j}(k) \ldots c_{N_{ut},j}(k)/K_{ap,j,j}(k)]^T. \quad \text{Eq (14)}$$

The mean of the inverses of the normalized columns is then determined as the sum of the inverses of the $N_{ap}$ normalized columns divided by $N_{ap}$ (step 434). The correction vector $\hat{\underline{k}}_{ut}(k)$ is set equal to this mean (step 436), which may be expressed as:

$$\hat{\underline{k}}_{ut}(k) = \frac{1}{N_{ap}} \sum_{j=1}^{N_{ap}} \frac{1}{\underline{\check{c}}_j(k)}, \text{ for } k \in K, \quad \text{Eq (15)}$$

where the inversion of the normalized columns, $\underline{\check{c}}_j(k)$, is performed element-wise.

B. MMSE Computation

For the MMSE computation, the correction factors $\hat{K}_{ap}(k)$ and $\hat{K}_{ut}(k)$ are derived from the downlink and uplink channel response estimates $\hat{\underline{H}}_{dn}(k)$ and $\hat{\underline{H}}_{up}(k)$ such that the mean square error (MSE) between the calibrated downlink channel response and the calibrated uplink channel response is minimized. This condition may be expressed as:

$$\min |(\hat{\underline{H}}_{dn}(k)\hat{\underline{K}}_{ap}(k))^T - \hat{\underline{H}}_{up}(k)\hat{\underline{K}}_{ut}(k)|^2, \text{ for } k \in K, \quad \text{Eq (16)}$$

which may also be written as:

$$\min |\underline{\hat{K}}_{ap}(k)\underline{\hat{H}}_{dn}^T(k) - \underline{\hat{H}}_{up}(k)\underline{\hat{K}}_{ut}(k)|^2, \text{ for } k \in K,$$

where $\hat{K}_{ap}^T(k) = \hat{K}_{ap}(k)$ since $\hat{K}_{ap}(k)$ is a diagonal matrix.

Equation (16) is subject to the constraint that the lead element of $\hat{K}_{ap}(k)$ is set equal to unity (i.e., $\hat{K}_{ap,0,0}(k)=1$). Without this constraint, the trivial solution would be obtained with all elements of the matrices $\hat{K}_{ap}(k)$ and $\hat{K}_{ut}(k)$ set equal to zero. In equation (16), a matrix $Y(k)$ is first obtained as $Y(k)=\underline{\hat{K}}_{ap}(k)\underline{\hat{H}}_{dn}^T(k) - \hat{H}_{up}(k)\hat{K}_{ut}(k)$. The square of the absolute value is next obtained for each of the $N_{ap} \cdot N_{ut}$ entries of the matrix $Y(k)$. The mean square error (or the square error, since a divide by $N_{ap} \cdot N_{ut}$ is omitted) is then equal to the sum of all $N_{ap} \cdot N_{ut}$ squared values.

The MMSE computation is performed for each designated subband to obtain the correction factors $\hat{K}_{ap}(k)$ and $\hat{K}_{ut}(k)$ for that subband. The MMSE computation for one subband is described below. For simplicity, the subband index, k, is omitted in the following description. Also for simplicity, the elements of the downlink channel response estimate $\hat{H}_{dn}^T$ are denoted as $\{a_{ij}\}$, the elements of the uplink channel response estimate $\hat{H}_{up}$ are denoted as $\{b_{ij}\}$, the diagonal elements of the matrix $\hat{K}_{ap}$ are denoted as $\{u_i\}$, and the diagonal elements of the matrix $\hat{K}_{ut}$ are denoted as $\{v_j\}$, where $i=\{1 \ldots N_{ap}\}$ and $j=\{1 \ldots N_{ut}\}$.

The mean square error may be rewritten from equation (16), as follows:

$$MSE = \sum_{j=1}^{N_{ut}} \sum_{i=1}^{N_{ap}} |a_{ij} u_i - b_{ij} v_j|^2, \quad \text{Eq (17)}$$

again subject to the constraint $u_1=1$. The minimum mean square error may be obtained by taking the partial derivatives of equation (17) with respect to u and v and setting the partial derivatives to zero. The results of these operations are the following equation sets:

$$\sum_{j=1}^{N_{ut}} (a_{ij} u_i - b_{ij} v_j) \cdot a_{ij}^* = 0, \text{ for } i \in \{2 \ldots N_{ap}\}, \text{ and} \quad \text{Eq (18a)}$$

$$\sum_{i=1}^{N_{ap}} (a_{ij} u_i - b_{ij} v_j) \cdot b_{ij}^* = 0, \text{ for } j \in \{1 \ldots N_{ut}\}. \quad \text{Eq (18b)}$$

In equation (18a), $u_1=1$ so there is no partial derivative for this case, and the index i runs from 2 through $N_{ap}$.

The set of $(N_{ap}+N_{ut}-1)$ equations in equation sets (18a) and (18b) may be more conveniently expressed in matrix form, as follows:

$$\underline{A}\underline{y} = \underline{z}, \text{ where} \quad \text{Eq (19)}$$

$$\underline{A} = \begin{bmatrix}
\sum_{j=1}^{N_{ut}} |a_{2j}|^2 & 0 & \ldots & 0 & -b_{21} a_{21}^* & \ldots & -b_{2N_{ap}} a_{2N_{ut}}^* \\
0 & \sum_{j=1}^{N_{ut}} |a_{3j}|^2 & 0 & \ldots & \ldots & \ldots & \ldots \\
\ldots & 0 & \ldots & 0 & & & \\
0 & \ldots & 0 & \sum_{j=1}^{N_{ut}} |a_{N_{ap}j}|^2 & -b_{N_{ap}1} a_{N_{ap}1}^* & & -b_{N_{ap}N_{ut}} a_{N_{ap}N_{ut}}^* \\
-a_{21} b_{21}^* & \ldots & -a_{N_{ap}1} b_{N_{ap}1}^* & \sum_{i=1}^{N_{ap}} |b_{i1}|^2 & 0 & \ldots & 0 \\
\ldots & \ldots & & 0 & \sum_{i=1}^{N_{ap}} |b_{i2}|^2 & 0 & \ldots \\
& & & \ldots & 0 & \ldots & 0 \\
-a_{2N_{ut}} b_{2N_{ut}}^* & \ldots & -a_{N_{ap}N_{ut}} b_{N_{ap}N_{ut}}^* & 0 & \ldots & 0 & \sum_{i=1}^{N_{ap}} |b_{iN_{ut}}|^2
\end{bmatrix}$$

$$\underline{y} = \begin{bmatrix} u_2 \\ u_3 \\ \ldots \\ u_{N_{ap}} \\ v_1 \\ v_2 \\ \ldots \\ v_{N_{ut}} \end{bmatrix} \text{ and } \underline{z} = \begin{bmatrix} 0 \\ 0 \\ \ldots \\ 0 \\ a_{11} b_{11}^* \\ a_{12} b_{12}^* \\ \ldots \\ a_{1N_{ut}} b_{1N_{ut}}^* \end{bmatrix}.$$

The matrix $\underline{A}$ includes $(N_{ap}+N_{ut}-1)$ rows, with the first $N_{ap}-1$ rows corresponding to the $N_{ap}-1$ equations from equation set (18a) and the last $N_{ut}$ rows corresponding to the $N_{ut}$ equations from equation set (18b). In particular, the first row of the matrix $\underline{A}$ is generated from equation set (18a) with i=2, the second row is generated with i=3, and so on. The $N_{ap}$-th row of the matrix $\underline{A}$ is generated from equation set (18b) with j=1, and so on, and the last row is generated with j=$N_{ut}$. As shown above, the entries of the matrix $\underline{A}$ and the entries of the vector $\underline{z}$ may be obtained based on the entries in the matrices $\hat{\underline{H}}_{dn}^T$ and $\hat{\underline{H}}_{up}$.

The correction factors are included in the vector $\underline{y}$, which may be obtained as:

$$\underline{y}=\underline{A}^{-1}\underline{z}. \qquad \text{Eq (20)}$$

The results of the MMSE computation are correction matrices $\hat{\underline{K}}_{ap}$ and $\hat{\underline{K}}_{ut}$ that minimize the mean square error in the calibrated downlink and uplink channel responses, as shown in equation (16). Since the matrices and $\hat{\underline{K}}_{ap}$ and $\hat{\underline{K}}_{ut}$ are obtained based on the downlink and uplink channel response estimates, $\hat{\underline{H}}_{dn}$ and $\hat{\underline{H}}_{up}$, the quality of the correction matrices $\hat{\underline{K}}_{ap}$ and $\hat{\underline{K}}_{ut}$ are thus dependent on the quality of the channel estimates $\hat{\underline{H}}_{dn}$ and $\hat{\underline{H}}_{up}$. The MIMO pilot may be averaged at the receiver to obtain more accurate estimates for $\hat{\underline{H}}_{dn}$ and $\hat{\underline{H}}_{up}$.

The correction matrices, $\hat{\underline{K}}_{ap}$ and $\hat{\underline{K}}_{ut}$, obtained based on the MMSE computation are generally better than the correction matrices obtained based on the matrix-ratio computation, especially when some of the channel gains are small and measurement noise can greatly degrade the channel gains.

C. Post Computation

Regardless of the particular computation method selected for use, after completion of the computation of the correction matrices, the user terminal sends to the access point the correction vectors for the access point, $\hat{\underline{k}}_{ap}(k)$, for all designated subbands. If 12-bit complex values are used for each correction factor in $\hat{\underline{k}}_{ap}(k)$, then the correction vectors $\hat{\underline{k}}_{ap}(k)$ for all designated subbands may be sent to the access point in $3 \cdot (N_{ap}-1) \cdot N_{sb}$ bytes, where "3" is for the 24 total bits used for the I and Q components and $(N_{ap}-1)$ results from the first element in each vector $\hat{\underline{k}}_{ap}(k)$ being equal to unity and thus not needing to be sent. If the first element is set to $2^9-1=+511$, then 12 dB of headroom is available (since the maximum positive 12-bit signed value is $2^{11}-1=+2047$), which would then allow gain mismatch of up to 12 dB between the downlink and uplink to be accommodated by 12-bit values. If the downlink and uplink match to within 12 dB and the first element is normalized to a value of 511, then the other elements should be no greater than $511 \cdot 4=2044$ in absolute value and can be represented with 12 bits.

A pair of correction vectors $\hat{\underline{k}}_{ap}(k)$ and $\hat{\underline{k}}_{ut}(k)$ is obtained for each designated subband. If the calibration is performed for fewer than all of the data subbands, then the correction factors for the "uncalibrated" subbands may be obtained by interpolating the correction factors obtained for the designated subbands. The interpolation may be performed by the access point to obtain the correction vectors $\hat{\underline{k}}_{ap}(k)$, for k∈K. Similarly, the interpolation may be performed by the user terminal to obtain the correction vectors $\hat{\underline{k}}_{ut}(k)$, for k∈K.

The access point and user terminal thereafter use their respective correction vectors $\hat{\underline{k}}_{ap}(k)$ and $\hat{\underline{k}}_{ut}(k)$, or the corresponding correction matrices $\hat{\underline{K}}_{ap}(k)$ and $\hat{\underline{K}}_{ut}(k)$, for k∈K, to scale modulation symbols prior to transmission over the wireless channel, as described below. The effective downlink channel that the user terminal sees would then be $\underline{H}_{cdn}(k)=\underline{H}_{dn}(k)\hat{\underline{K}}_{ap}(k)$.

The calibration scheme described above, whereby a vector of correction factors is obtained for each of the access point and user terminal, allows "compatible" correction vectors to be derived for the access point when the calibration is performed by different user terminals. If the access point has already been calibrated (e.g., by one or more other user terminals), then the current correction vectors may be updated with the newly derived correction vectors.

For example, if two user terminals simultaneously perform the calibration procedure, then the calibration results from these user terminals may be averaged to improve performance. However, calibration is typically performed for one user terminal at a time. So the second user terminal observes the downlink with the correction vector for the first user terminal already applied. In this case, the product of the second correction vector with the old correction vector may be used as the new correction vector, or a "weighted averaging" (described below) may also be used. The access point typically uses a single correction vector for all user terminals, and not different ones for different user terminals (although this may also be implemented). Updates from multiple user terminals or sequential updates from one user terminal may be treated in the same manner. The updated vectors may be directly applied (by a product operation). Alternatively, if some averaging is desired to reduce measurement noise, then weighted averaging may be used as described below.

Thus, if the access point uses correction vectors $\hat{\underline{k}}_{ap1}(k)$ to transmit the MIMO pilot from which the user terminal determines new correction vectors $\hat{\underline{k}}_{ap2}(k)$, then the updated correction vectors $\hat{\underline{k}}_{ap3}(k)$ are the product of the current and new correction vectors. The correction vectors $\hat{\underline{k}}_{ap1}(k)$ and $\hat{\underline{k}}_{ap2}(k)$ may be derived by the same or different user terminals.

In one embodiment, the updated correction vectors are defined as $\hat{\underline{k}}_{ap3}(k)=\hat{\underline{k}}_{ap1}(k) \cdot \hat{\underline{k}}_{ap2}(k)$, where the multiplication is element-by-element. In another embodiment, the updated correction vectors may be redefined as $\hat{\underline{k}}_{ap3}(k)=\hat{\underline{k}}_{ap1}(k) \cdot \hat{\underline{k}}_{ap2}^\alpha(k)$, where α is a factor used to provide weighted averaging (e.g., 0<α<1). If the calibration updates are infrequent, then □ close to one might perform best. If the calibration updates are frequent but noisy, then a smaller value for □ is better. The updated correction vectors $\hat{\underline{k}}_{ap3}(k)$ may then be used by the access point until they are updated again.

As noted above, the calibration may be performed for fewer than all data subbands. For example, the calibration may be performed for every n-th subband, where n may be determined by the expected response of the transmit/receive chains (e.g., n may be 2, 4, 8, 16, and so on). The calibration may also be performed for non-uniformly distributed subbands. For example, since there may be more filter roll-off at the edges of the passband, which may create more mismatch in the transmit/receive chains, more subbands near the band edges may be calibrated. In general, any number and any distribution of subbands may be calibrated, and this is within the scope of the invention.

In the above description, the correction vectors $\hat{\underline{k}}_{ap}(k)$ and $\hat{\underline{k}}_{ut}(k)$, for k∈K', are derived by the user terminal, and the vectors $\hat{\underline{k}}_{ap}(k)$ are sent back to the access point. This scheme advantageously distributes the calibration processing among the user terminals for a multiple-access system. However, the correction vectors $\hat{\underline{k}}_{ap}(k)$ and $\hat{\underline{k}}_{ut}(k)$ may also be derived by the access point, which would then send the vectors $\hat{\underline{k}}_{ut}(k)$ back to the user terminal, and this is within the scope of the invention.

The calibration scheme described above allows each user terminal to calibrate its transmit/receive chains in real-time via over-the-air transmission. This allows user terminals with different frequency responses to achieve high performance without the need for tight frequency response specifications or to perform calibration at the factory. The access point may be calibrated by multiple user terminals to provide improved accuracy.

D. Gain Considerations

The calibration may be performed based on "normalized" gains for the downlink and uplink channels, which are gains given relative to the noise floor at the receiver. The use of the normalized gains allows the characteristics of one link (including the channel gains and SNR per eigenmode) to be obtained based on gain measurements for the other link, after the downlink and uplink have been calibrated.

The access point and user terminal may initially balance their receiver input levels such that the noise levels on the receive paths for the access point and user terminal are approximately the same. The balancing may be done by estimating the noise floor, that is, finding a section of a received TDD frame (i.e., a unit of downlink/uplink transmission) that has a minimum average power over a particular time duration (e.g., one or two symbol periods). Generally, the time just before the start of each TDD frame is clear of transmissions, since any uplink data needs to be received by the access point and then a receive/transmit turnaround time is necessary before the access point transmits on the downlink. Depending on the interference environment, the noise floor may be determined based on a number of TDD frames. The downlink and uplink channel responses are then measured relative to this noise floor. More specifically, the channel gain for a given subband of a given transmit/receive antenna pair may first be obtained, for example, as the ratio of the received pilot symbol over the transmitted pilot symbol for that subband of that transmit/receive antenna pair. The normalized gain is then the measured gain divided by the noise floor.

A large difference in the normalized gains for the access point and the normalized gains for the user terminal can result in the correction factors for the user terminal being greatly different from unity. The correction factors for the access point are close to unity because the first element of the matrix $\hat{K}_{ap}$ set to 1.

If the correction factors for the user terminal differ greatly from unity, then the user terminal may not be able to apply the computed correction factors. This is because the user terminal has a constraint on its maximum transmit power and may not be capable of increasing its transmit power for large correction factors. Moreover, a reduction in transmit power for small correction factors is generally not desirable, since this may reduce the achievable data rate.

Thus, the user terminal can transmit using a scaled version of the computed correction factors. The scaled calibration factors may be obtained by scaling the computed correction factors by a particular scaling value, which may be set equal to a gain delta (difference or ratio) between the downlink and uplink channel responses. This gain delta can be computed as an average of the differences (or deltas) between the normalized gains for the downlink and uplink. The scaling value (or gain delta) used for the correction factors for the user terminal can be sent to the access point along with the computed correction factors for the access point.

With the correction factors and the scaling value or gain delta, the downlink channel characteristics may be determined from the measured uplink channel response, and vice versa. If the noise floor at either the access point or the user terminal changes, then the gain delta can be updated, and the updated gain delta may be sent in a message to the other entity.

In the above description, the calibration results in two sets (or vectors or matrices) of correction factors for each subband, with one set being used by the access point for downlink data transmission and the other set being used by the user terminal for uplink data transmission. The calibration may also be performed such that two sets of correction factors are provided for each subband, with one set being used by the access point for uplink data reception and the other set being used by the user terminal for downlink data reception. The calibration may also be performed such that one set of correction factors is obtained for each subband, and this set may be used at either the access point or the user terminal. In general, the calibration is performed such that the calibrated downlink and uplink channel responses are reciprocal, regardless of where correction factors are applied.

2. MIMO Pilot

For the calibration, a MIMO pilot is transmitted on the uplink by the user terminal to allow the access point to estimate the uplink channel response, and a MIMO pilot is transmitted on the downlink by the access point to allow the user terminal to estimate the downlink channel response. The same or different MIMO pilots may be used for the downlink and uplink, and the MIMO pilots used are known at both the access point and user terminal.

In an embodiment, the MIMO pilot comprises a specific OFDM symbol (denoted as "P") that is transmitted from each of the $N_T$ transmit antennas, where $N_T=N_{ap}$ for the downlink and $N_T=N_{ut}$ for the uplink. For each transmit antenna, the same P OFDM symbol is transmitted in each symbol period designated for MIMO pilot transmission. However, the P OFDM symbols for each antenna are covered with a different N-chip Walsh sequence assigned to that antenna, where $N \geq N_{ap}$ for the downlink and $N \geq N_{ut}$ for the uplink. The Walsh covering maintains orthogonality between the $N_T$ transmit antennas and allows the receiver to distinguish the individual transmit antennas.

The P OFDM symbol includes one modulation symbol for each of the $N_{sb}$ designated subbands. The P OFDM symbol thus comprises a specific "word" of $N_{sb}$ modulation symbols that may be selected to facilitate channel estimation by the receiver. This word may also be defined to minimize the peak-to-average variation in the transmitted MIMO pilot. This may then reduce the amount of distortion and non-linearity generated by the transmit/receive chains, which may then result in improved accuracy for the channel estimation.

For clarity, a specific MIMO pilot is described below for a specific MIMO-OFDM system. For this system, the access point and user terminal each has four transmit/receive antennas. The system bandwidth is partitioned into 64 orthogonal subbands (i.e., $N_F=64$), which are assigned indices of +31 to −32. Of these 64 subbands, 48 subbands (e.g., with indices of $\pm\{1,\ldots 6, 8, \ldots, 20, 22, \ldots, 26\}$) are used for data, 4 subbands (e.g., with indices of $\pm\{7, 21\}$) are used for pilot and possibly signaling, the DC subband (with index of 0) is not used, and the remaining subbands are also not used and serve as guard subbands. This OFDM subband structure is described in further detail in a document for IEEE Standard 802.11a and entitled "Part 11: Wireless LAN Medium Access Control (MAC) and Physical Layer (PHY) specifications: High-speed Physical Layer in the 5 GHz Band," September 1999, which is publicly available and incorporated herein by reference.

The P OFDM symbol includes a set of 52 QPSK modulation symbols for the 48 data subbands and 4 pilot subbands. This P OFDM symbol may be given as follows:

$$P(\text{real})=g \cdot \{0,0,0,0,0,0,-1,-1,-1,-1,1,1,1,-1,-1,1,-1,$$
$$1,1,1,1,-1,-1,1,-1,-1,-1,-1,-1,1,-1,-1,0,1,-1,-$$

1,-1,-1,-1,1,-1,-1,-1,-1,1,1,-1,-1,1,-1,1,
1,-1,1,-1,1,-1,1,-,0,0,0,0,0},

P(imag)=g·{0,0,0,0,0,0,-1,1,1,1,-1,-1,1,-1,1,1,1,-1,
1,-1,-1,-1,-1,-1,1,1,-1,1,1,-1,1,1,-1,1,0,-1,-1,-
1,-1,1,1,-1,1,-1,-1,1,-1,1,-1,1,1,1,-1,1,1,1,1,1,
1,-1,-1,0,0,0,0,0}, where g is a gain for the pilot. The values within the { } bracket are given for subband indices −32 through −1 (for the first line) and 0 through +31 (for the second line). Thus, the first line for P(real) and P(imag) indicates that symbol (−1−j) is transmitted in subband −26, symbol (−1+j) is transmitted in subband −25, and so on. The second line for P(real) and P(imag) indicates that symbol (1−j) is transmitted in subband 1, symbol (−1−j) is transmitted in subband 2, and so on. Other OFDM symbols may also be used for the MIMO pilot.

In an embodiment, the four transmit antennas are assigned Walsh sequences of $W_1$=1111, $W_2$=1010, $W_3$=1100, and $W_4$=1001 for the MIMO pilot. For a given Walsh sequence, a value of "1" indicates that a P OFDM symbol is transmitted and a value of "0" indicates that a −P OFDM symbol is transmitted (i.e., each of the 52 modulation symbols in P is inverted).

Table 1 lists the OFDM symbols transmitted from each of the four transmit antennas for a MIMO pilot transmission that spans four symbol periods.

TABLE 1

| OFDM symbol | Antenna 1 | Antenna 2 | Antenna 3 | Antenna 4 |
|---|---|---|---|---|
| 1 | +P | +P | +P | +P |
| 2 | +P | −P | +P | −P |
| 3 | +P | +P | −P | −P |
| 4 | +P | −P | −P | +P |

For longer MIMO pilot transmission, the Walsh sequence for each transmit antenna is simply repeated. For this set of Walsh sequences, the MIMO pilot transmission occurs in integer multiples of four symbol periods to ensure orthogonality among the four transmit antennas.

The receiver may derive an estimate of the channel response based on the received MIMO pilot by performing the complementary processing. In particular, to recover the pilot sent from transmit antenna i and received by receive antenna j, the pilot received by receive antenna j is first processed with the Walsh sequence assigned to transmit antenna i in a complementary manner to the Walsh covering performed at the transmitter. The decovered OFDM symbols for all $N_{ps}$ symbol periods for the MIMO pilot are then accumulated, where the accumulation is performed individually for each of the 52 subbands used to carry the MIMO pilot. The results of the accumulation is $\hat{h}_{i,j}(k)$, for k=±{1, . . . , 26}, which is an estimate of the effective channel response from transmit antenna i to receive antenna j (i.e., including the responses for the transmit/receive chains) for the 52 data and pilot subbands.

The same processing may be performed to recover the pilot from each transmit antenna at each receive antenna. The pilot processing provides $N_{ap} \cdot N_{ut}$ values that are the elements of the effective channel response estimate, $\hat{H}_{up}(k)$ or $\hat{H}_{dn}(k)$, for each of the 52 subbands.

The channel estimation described above may be performed by both the access point and the user terminal during calibration to obtain the effective uplink channel response estimate $\hat{H}_{up}(k)$ and the effective downlink channel response estimate $\hat{H}_{dn}(k)$, respectively, which are then used to derive the correction factors as described above.

3. Spatial Processing

The correlation between the downlink and uplink channel responses may be exploited to simplify the channel estimation and spatial processing at the access point and user terminal for TDD MIMO and MIMO-OFDM systems. This simplification is possible after calibration has been performed to account for differences in the transmit/receive chains. As noted above, the calibrated channel responses are:

$$\underline{H}_{cdn}(k) = \underline{H}_{dn}(k)\hat{\underline{K}}_{ap}(k), \text{ for the downlink, and} \quad \text{Eq (21a)}$$

$$\underline{H}_{cup}(k) = (\underline{H}_{dn}(k)\hat{\underline{K}}_{ap}(k))^T \cong \underline{H}_{up}(k)\hat{\underline{K}}_{ut}(k), \text{ for the uplink.} \quad \text{Eq (21b)}$$

The last equality in equation (21b) comes from using the relationship between the effective downlink and uplink channel responses, $H_{up}(k) = (\underline{K}_{ut}^{-1}(k)\underline{H}_{dn}(k)\underline{K}_{ap}(k))^T$.

The channel response matrix $\overline{H}(k)$ for each subband may be "diagonalized" to obtain the $\overline{N}_S$ eigenmodes for that subband. This may be achieved by performing either singular value decomposition on the channel response matrix H(k) or eigenvalue decomposition on the correlation matrix of H(k), which is $R(k) = H^H(k)H(k)$.

The singular value decomposition of the calibrated uplink channel response matrix, $\underline{H}_{cup}(k)$, may be expressed as:

$$\underline{H}_{cup}(k) = \underline{U}_{ap}(k)\underline{\Sigma}(k)\underline{V}_{ut}^H(k), \text{ for } k \in K, \quad \text{Eq (22)}$$

where $\underline{U}_{ap}(k)$ is an $(N_{ut} \times N_{ut})$ unitary matrix of left eigenvectors of $\overline{H}_{cup}(k)$;
$\underline{\Sigma}(k)$ is an $(N_{ut} \times N_{ap})$ diagonal matrix of singular values of $\underline{H}_{cup}(k)$; and
$\underline{V}_{ut}(k)$ is an $(N_{ap} \times N_{ap})$ unitary matrix of right eigenvectors of $\overline{H}_{cup}(k)$.

A unitary matrix M is characterized by the property $M^H M = I$, where I is the identity matrix. Correspondingly, the singular value decomposition of the calibrated downlink channel response matrix, $\underline{H}_{cdn}(k)$, may be expressed as:

$$\underline{H}_{cdn}(k) = \underline{V}_{ut}^*(k)\underline{\Sigma}(k)\underline{U}_{ap}^T(k), \text{ for } k \in K. \quad \text{Eq (23)}$$

The matrices $\underline{V}_{ut}^*(k)$ and $\underline{U}_{ap}^*(k)$ are thus also matrices of left and right eigenvectors, respectively, of $H_{cdn}(k)$. The matrices $\underline{V}_{ut}(k)$, $\underline{V}_{ut}^*(k)$, $\underline{V}_{ut}^T(k)$, and $\underline{V}_{ut}^H(k)$ are different forms of the matrix $\underline{V}_{ut}(k)$, and the matrices $\underline{U}_{ap}(k)$, $\underline{U}_{ap}^*(k)$, $\underline{U}_{ap}^T(k)$, and $\underline{U}_{ap}^H(k)$ are also different forms of the matrix $\overline{U}_{ap}(k)$. For simplicity, reference to the matrices $H_{ap}(k)$ and $\overline{V}_{ut}(k)$ in the following description may also refer to their various other forms. The matrices $\underline{U}_{ap}(k)$ and $\underline{V}_{ut}(k)$ are used by the access point and user terminal, respectively, for spatial processing and are denoted as such by their subscripts.

The singular value decomposition is described in further detail by Gilbert Strang entitled "Linear Algebra and Its Applications," Second Edition, Academic Press, 1980.

The user terminal can estimate the calibrated downlink channel response based on a MIMO pilot sent by the access point. The user terminal may then perform the singular value decomposition of the calibrated downlink channel response estimate $\hat{H}_{cdn}(k)$, for k∈K, to obtain the diagonal matrices $\hat{\Sigma}(k)$ and the matrices $\underline{V}_{ut}^*(k)$ of left eigenvectors of $\hat{H}_{cdn}(k)$. This singular value decomposition may be given as $\hat{\underline{H}}_{cdn}(k) = \hat{V}_{ut}^*(k)\hat{\Sigma}(k)\hat{U}_{ap}^T(k)$, where the hat ("^") above each matrix indicates that it is an estimate of the actual matrix.

Similarly, the access point can estimate the calibrated uplink channel response based on a MIMO pilot sent by the user terminal. The access point may then perform the singular value decomposition of the calibrated uplink channel response estimate $\hat{\underline{H}}_{cup}(k)$, for k∈K, to obtain the diagonal matrices $\hat{\underline{\Sigma}}(k)$ and the matrices $\hat{\underline{U}}_{ap}(k)$ of left eigenvectors of $\hat{\underline{H}}_{cup}(k)$, for k∈K. This singular value decomposition may be given as $\hat{\underline{H}}_{cup}(k)=\hat{\underline{U}}_{ap}(k)\hat{\underline{\Sigma}}(k)\hat{\underline{V}}_{ut}^{H}(k)$.

Because of the reciprocal channel and the calibration, the singular value decomposition only need to be performed by either the user terminal or the access point to obtain both matrices $\hat{\underline{V}}_{ut}(k)$ and $\hat{\underline{U}}_{ap}(k)$. If performed by the user terminal, then the matrices $\hat{\underline{V}}_{ut}(k)$ are used for spatial processing at the user terminal and the matrices $\hat{\underline{U}}_{ap}(k)$ may be sent back to the access point.

The access point may also be able to obtain the matrices $\hat{\underline{U}}_{ap}(k)$ and $\hat{\underline{\Sigma}}(k)$ based on a steered reference sent by the user terminal. Similarly, the user terminal may also be able to obtain the matrices $\hat{\underline{V}}_{ut}(k)$ and $\hat{\underline{\Sigma}}(k)$ based on a steered reference sent by the access point. The steered reference is described in detail in the aforementioned provisional U.S. Patent Application Ser. No. 60/421,309.

The matrices $\hat{\underline{U}}_{ap}(k)$ and $\hat{\underline{\Sigma}}(k)$ may be used to transmit independent data streams on the $N_S$ eigenmodes of the MIMO channel, where $N_S \leq \min\{N_{ap}, N_{ut}\}$. The spatial processing to transmit multiple data streams on the downlink and uplink is described below.

A. Uplink Spatial Processing

The spatial processing by the user terminal for an uplink transmission may be expressed as:

$$\underline{x}_{up}(k)=\hat{\underline{K}}_{ut}(k)\hat{\underline{V}}_{ut}(k)\underline{s}_{up}(k), \text{ for } k \in K, \quad \text{Eq (24)}$$

where $\underline{x}_{up}(k)$ the transmit vector for the uplink for the k-th subband; and $\underline{s}_{up}(k)$ is a "data" vector with up to $N_S$ non-zero entries for the modulation symbols to be transmitted on the N eigenmodes of the k-th subband.

Additional processing may also be performed on the modulation symbols prior to transmission. For example, channel inversion may be applied across the data subbands (e.g., for each eigenmode) such that the received SNR is approximately equal for all data subbands. The spatial processing may then be expressed as:

$$\underline{x}_{up}(k)=\hat{\underline{K}}_{ut}(k)\hat{\underline{V}}_{ut}(k)\underline{W}_{up}(k)\underline{s}_{up}(k), \text{ for } k \in K, \quad \text{Eq (25)}$$

where $\underline{W}_{up}(k)$ is a matrix with weights for the (optional) uplink channel inversion.

The channel inversion may also be performed by assigning transmit power to each subband before the modulation takes place, in which case the vector $\underline{s}_{up}(k)$ includes the channel inversion coefficients and the matrix $\underline{W}_{up}(k)$ can be omitted from equation (25). In the following description, the use of the matrix $\underline{W}_{up}(k)$ in an equation indicates that the channel inversion coefficients are not incorporated into the vector $\underline{s}_{up}(k)$. The lack of the matrix $\underline{W}_{up}(k)$ in an equation can indicate either (1) channel inversion is not performed or (2) channel inversion is performed and incorporated into the vector $\underline{s}_{up}(k)$.

Channel inversion may be performed as described in the aforementioned provisional U.S. Patent Application Ser. No. 60/421,309 and in U.S. patent application Ser. No. 10/229,209, entitled "Coded MIMO Systems with Selective Channel Inversion Applied Per Eigenmode," filed Aug. 27, 2002, assigned to the assignee of the present application and incorporated herein by reference.

The received uplink transmission at the access point may be expressed as:

$$\underline{r}_{up}(k) = \underline{H}_{up}(k)\underline{x}_{up}(k) + \underline{n}(k), \quad \text{Eq (26)}$$
$$\approx \hat{\underline{U}}_{ap}(k)\hat{\underline{\Sigma}}(k)\underline{s}_{up}(k) + \underline{n}(k)$$

for $k \in K$, where $\underline{r}_{up}(k)$ is the received vector for the uplink for the k-th subband;

$\underline{n}(k)$ is additive white Gaussian noise (AWGN) for the k-th subband; and $\underline{x}_{up}(k)$ is as shown in equation (24).

The spatial processing (or matched filtering) at the access point for the received uplink transmission may be expressed as:

$$\hat{\underline{s}}_{up}(k) = \hat{\underline{\Sigma}}^{-1}(k)\hat{\underline{U}}_{ap}^{H}(k)\underline{r}_{up}(k) \quad \text{Eq (27)}$$
$$= \hat{\underline{\Sigma}}^{-1}(k)\hat{\underline{U}}_{ap}^{H}(k)(\hat{\underline{U}}_{ap}(k)\hat{\underline{\Sigma}}(k)\underline{s}_{up}(k) + \underline{n}(k))$$
$$= \underline{s}_{up}(k) + \hat{\underline{n}}(k),$$

for $k \in K$, where $\hat{\underline{s}}_{up}(k)$ is an estimate of the vector $\underline{s}_{up}(k)$ transmitted by the user terminal on the uplink, and $\tilde{n}(k)$ is the post-processed noise. Equation (27) assumes that channel inversion was not performed at the transmitter and that the received vector $\underline{r}_{up}(k)$ is as shown in equation (26).

B. Downlink Spatial Processing

The spatial processing by the access point for a downlink transmission may be expressed as:

$$\underline{x}_{dn}(k)=\hat{\underline{K}}_{ap}(k)\hat{\underline{U}}_{ap}^{*}(k)\underline{s}_{dn}(k), \text{ for } k \in K, \quad \text{Eq (28)}$$

where $\underline{x}_{dn}(k)$ is the transmit vector and $\underline{s}_{dn}(k)$ is the data vector for the downlink.

Again, additional processing (e.g., channel inversion) may also be performed on the modulation symbols prior to transmission. The spatial processing may then be expressed as:

$$\underline{x}_{dn}(k)=\hat{\underline{K}}_{ap}(k)\hat{\underline{U}}_{ap}^{*}(k)\underline{W}_{dn}(k)\underline{s}_{dn}(k), \text{ for } k \in K, \quad \text{Eq (29)}$$

where $\underline{W}_{dn}(k)$ is a matrix with weights for the (optional) downlink channel inversion.

The received downlink transmission at the user terminal may be expressed as:

$$\underline{r}_{dn}(k) = \underline{H}_{dn}(k)\underline{x}_{dn}(k) + \underline{n}(k), \quad \text{Eq (30)}$$
$$\approx \hat{\underline{V}}_{ut}^{*}(k)\hat{\underline{\Sigma}}(k)\underline{s}_{dn}(k) + \underline{n}(k)$$

for $k \in K$, where $\underline{x}_{dn}(k)$ is the transmit vector as shown in equation (28).

The spatial processing (or matched filtering) at the user terminal for the received downlink transmission may be expressed as:

$$\hat{\underline{s}}_{dn}(k) = \hat{\underline{\Sigma}}^{-1}(k)\hat{\underline{V}}_{ut}^{T}(k)\underline{r}_{dn}(k) \quad \text{Eq (31)}$$
$$= \hat{\underline{\Sigma}}^{-1}(k)\hat{\underline{V}}_{ut}^{T}(k)(\hat{\underline{V}}_{ut}^{*}(k)\hat{\underline{\Sigma}}(k)\underline{s}_{dn}(k) + \underline{n}(k))$$
$$= \underline{s}_{dn}(k) + \tilde{\underline{n}}(k),$$

-continued for $k \in K$.

Equation (31) assumes that channel inversion was not performed at the transmitter and that the received vector $\underline{r}_{dn}(k)$ is as shown in equation (30).

Table 2 summarizes the spatial processing at the access point and user terminal for data transmission and reception. Table 2 assumes that the additional processing by $\underline{W}(k)$ is performed at the transmitter. However, if this additional processing is not performed, then $\underline{W}(k)$ can be regarded as the identify matrix.

TABLE 2

|  | Uplink | Downlink |
| --- | --- | --- |
| User Terminal | Transmit: $\underline{x}_{up}(k) = \hat{\underline{K}}_{ut}(k)\hat{\underline{V}}_{ut}(k)\underline{W}_{up}(k)\underline{s}_{up}(k)$ | Receive: $\hat{\underline{s}}_{dn}(k) = \hat{\underline{\Sigma}}^{-1}(k)\hat{\underline{V}}_{ut}^{T}(k)\underline{r}_{dn}(k)$ |
| Access Point | Receive: $\hat{\underline{s}}_{up}(k) = \hat{\underline{\Sigma}}^{-1}(k)\hat{\underline{U}}_{ap}^{H}(k)\underline{r}_{up}(k)$ | Transmit: $\underline{x}_{dn}(k) = \hat{\underline{K}}_{ap}(k)\hat{\underline{U}}_{ap}^{*}(k)\underline{W}_{dn}(k)\underline{s}_{dn}(k)$ |

In the above description and as shown in Table 2, the correction matrices $\hat{\underline{K}}_{ap}(k)$ and $\hat{\underline{K}}_{ut}(k)$ are used for the transmit spatial processing at the access point and user terminal, respectively. This can simplify the overall spatial processing since the modulation symbols may need to be scaled anyway (e.g., for channel inversion) and the correction matrices $\hat{\underline{K}}_{ap}(k)$ and $\hat{\underline{K}}_{ut}(k)$ may be combined with the weight matrices $\underline{W}_{dn}(k)$ and $\underline{W}_{up}(k)$ to obtain gain matrices $\underline{G}_{dn}(k)$ and $\underline{G}_{up}(k)$, where $\underline{G}_{dn}(k)=\underline{W}_{dn}(k)\hat{\underline{K}}_{ap}(k)$ and $\underline{G}_{up}(k)=\underline{W}_{up}(k)\hat{\underline{K}}_{ut}(k)$. The processing may also be performed such that the correction matrices are used for the receive spatial processing (instead of the transmit spatial processing).

4. MIMO-OFDM System

Figure 5:
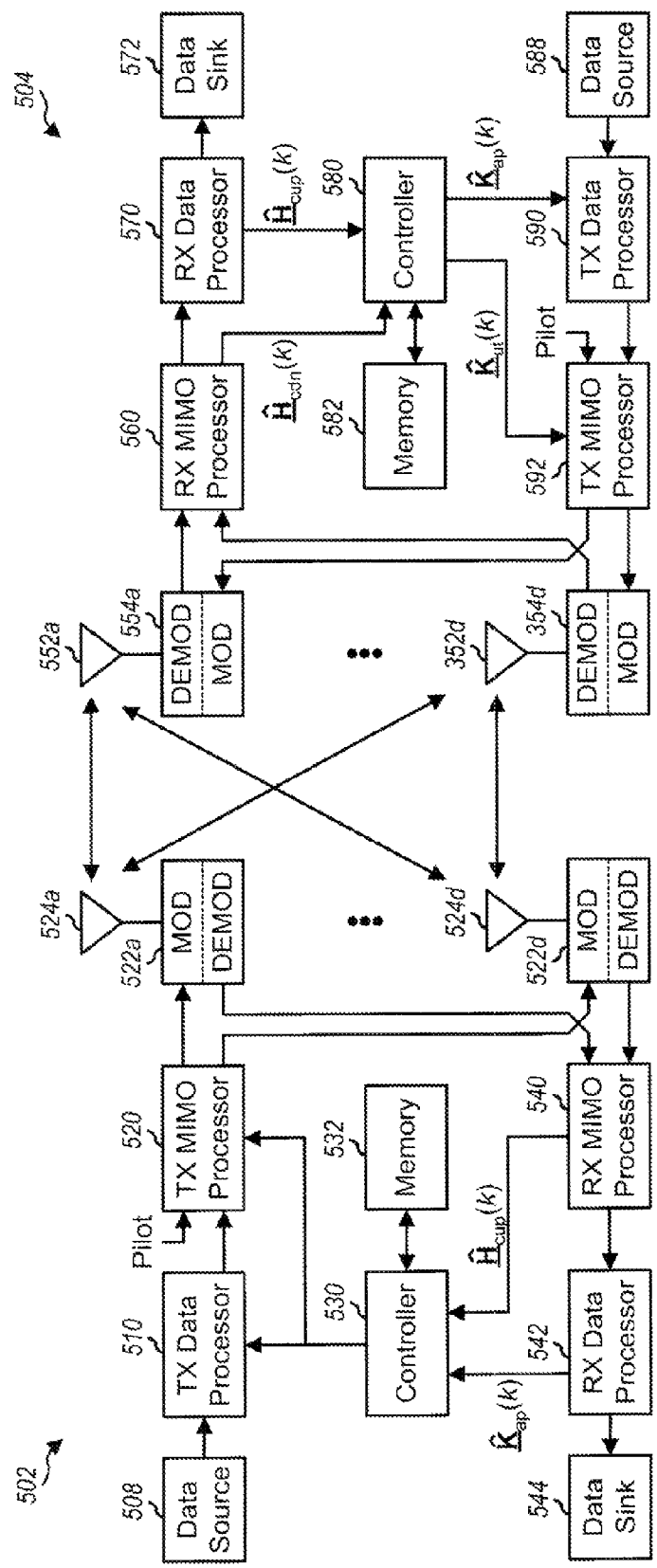
FIG. 5 is a block diagram of the access point and user terminal.

FIG. 5 is a block diagram of an embodiment of an access point 502 and a user terminal 504 within a TDD MIMO-OFDM system. For simplicity, the following description assumes that the access point and user terminal are each equipped with four transmit/receive antennas.

On the downlink, at access point 502, a transmit (TX) data processor 510 receives traffic data (i.e., information bits) from a data source 508 and signaling and other information from a controller 530. TX data processor 510 formats, codes, interleaves, and modulates (i.e., symbol maps) the data to provide a stream of modulation symbols for each eigenmode used for data transmission. A TX spatial processor 520 receives the modulation symbol streams from TX data processor 510 and performs spatial processing to provide four streams of transmit symbols, one stream for each antenna. TX spatial processor 520 also multiplexes in pilot symbols as appropriate (e.g., for calibration).

Each modulator (MOD) 522 receives and processes a respective transmit symbol stream to provide a corresponding stream of OFDM symbols. Each OFDM symbol stream is further processed by a transmit chain within modulator 522 to provide a corresponding downlink modulated signal. The four downlink modulated signals from modulator 522a through 522d are then transmitted from four antennas 524a through 524d, respectively.

At user terminal 504, antennas 552 receive the transmitted downlink modulated signals, and each antenna provides a received signal to a respective demodulator (DEMOD) 554. Each demodulator 554 (which includes a receive chain) performs processing complementary to that performed at modulator 522 and provides received symbols. A receive (RX) spatial processor 560 then performs spatial processing on the received symbols from all demodulators 554 to provide recovered symbols, which are estimates of the modulation symbols sent by the access point. During calibration, RX spatial processor 560 provides a calibrated downlink channel estimate, $\hat{\underline{H}}_{cdn}(k)$, based on the MIMO pilot transmitted by the access point.

An RX data processor 570 processes (e.g., symbol demaps, deinterleaves, and decodes) the recovered symbols to provide decoded data. The decoded data may include recovered traffic data, signaling, and so on, which are provided to a data sink 572 for storage and/or a controller 580 for further processing. During calibration, RX data processor 570 provides the calibrated uplink channel estimate, $\hat{\underline{H}}_{cup}(k)$, which is derived by the access point and sent on the downlink.

Controllers 530 and 580 control the operation of various processing units at the access point and user terminal, respectively. During calibration, controller 580 may receive the channel response estimates $\hat{\underline{H}}_{cdn}(k)$ and $\hat{\underline{H}}_{cup}(k)$, derive the correction matrices $\hat{\underline{K}}_{ap}(k)$ and $\hat{\underline{K}}_{ut}(k)$, provide the matrices $\hat{\underline{K}}_{ut}(k)$ to a TX spatial processor 592 for uplink transmission, and provide the matrices $\hat{\underline{K}}_{ap}(k)$ to a TX data processor 590 for transmission back to the access point. Memory units 532 and 582 store data and program codes used by controllers 530 and 580, respectively.

The processing for the uplink may be the same or different from the processing for the downlink. Data and signaling are processed (e.g., coded, interleaved, and modulated) by a TX data processor 590 and further spatially processed by TX spatial processor 592, which multiplexes in pilot symbols during calibration. The pilot and modulation symbols are further processed by modulators 554 to generate uplink modulated signals, which are then transmitted via antennas 552 to the access point.

At access point 110, the uplink modulated signals are received by antennas 524, demodulated by demodulators 522, and processed by an RX spatial processor 540 and an RX data processor 542 in a complementary to that performed at the user terminal. During calibration, RX spatial processor 560 also provides a calibrated uplink channel estimate, $\hat{\underline{H}}_{cup}(k)$, based on the MIMO pilot transmitted by the user terminal. The matrices $\hat{\underline{H}}_{cup}(k)$ are received by controller 530 and then provided to TX data processor 510 for transmission back to the user terminal.

Figure 6:
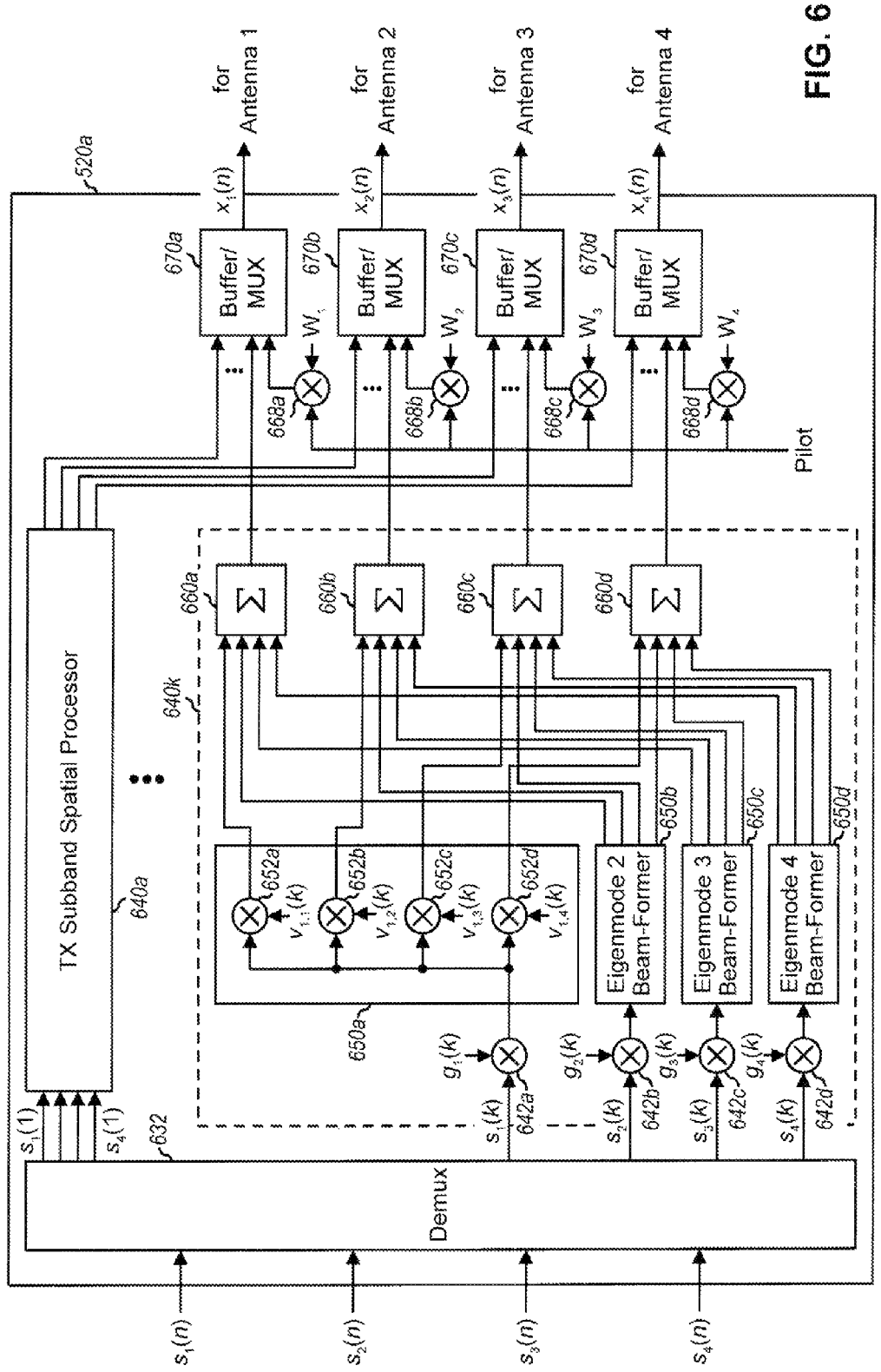
FIG. 6 is a block diagram of a TX spatial processor.

FIG. 6 is a block diagram of a TX spatial processor 520a, which may be used for TX spatial processors 520 and 592 in FIG. 5. For simplicity, the following description assumes that all four eigenmodes are selected for use.

Within processor 520a, a demultiplexer 632 receives four modulation symbol steams (denoted as $s_1(n)$ through $s_4(n)$) to be transmitted on four eigenmodes, demultiplexes each stream into $N_D$ substreams for the $N_D$ data subbands, and provides four modulation symbol substreams for each data subband to a respective TX subband spatial processor 640. Each processor 640 performs the processing shown in equation (24), (25), (28), or (29) for one subband.

Within each TX subband spatial processor 640, the four modulation symbol substreams (denoted as $s_1(k)$ through $s_4(k)$) are provided to four multipliers 642a through 642d, which also receive the gains $g_1(k)$, $g_2(k)$, $g_3(k)$, and $g_4(k)$ for the four eigenmodes of the associated subband. For the downlink, the four gains for each data subband are the diagonal elements of the corresponding matrix $\underline{G}_{dn}(k)$, where $\underline{G}_{dn}(k) = \hat{\underline{K}}_{ap}(k)$ or $\underline{G}_{dn}(k) = \underline{W}_{dn}(k) \hat{\underline{K}}_{ap}(k)$. For the uplink, the gains are the diagonal elements of the matrix $\underline{G}_{up}(k)$, where $\underline{G}_{up}(k) = \hat{\underline{K}}_{ut}(k)$ or $\underline{G}_{up}(k) = \underline{W}_{up}(k) \hat{\underline{K}}_{ut}(k)$. Each multiplier 642 scales its modulation symbols with its gain $g_m(k)$ to provide scaled modulation symbols. Multipliers 642a through 642d provides four scaled modulation symbol substreams to four beam-formers 650a through 650d, respectively.

Each beam-former 650 performs beam-forming to transmit one symbol substream on one eigenmode of one subband. Each beam-former 650 receives one scaled symbol substream $s_m(k)$ and performs beam-forming using the eigenvector $\underline{v}_m(k)$ for the associated eigenmode. Within each beam-former 650, the scaled modulation symbols are provided to four multipliers 652a through 652d, which also receive four elements, $v_{m,1}(k)$, $v_{m,2}(k)$, $v_{m,3}(k)$, and $v_{m,4}(k)$, of the eigenvector $\underline{v}_m(k)$ for the associated eigenmode. The eigenvector $\underline{v}_m(k)$ is the m-th column of the matrix $\hat{\underline{U}}_{ap}^*(k)$ for the downlink and is the m-th column of the matrix $\hat{\underline{V}}_{ut}(k)$ for the uplink. Each multiplier 652 then multiplies the scaled modulation symbols with its eigenvector value $v_{m,j}(k)$ to provide "beam-formed" symbols. Multipliers 652a through 652d provide four beam-formed symbol substreams (which are to be transmitted from four antennas) to summers 660a through 660d, respectively.

Each summer 660 receives and sums four beam-formed symbols for the four eigenmodes for each symbol period to provide a preconditioned symbol for an associated transmit antenna. Summers 660a through 660d provides four substreams of preconditioned symbols for four transmit antennas to buffers/multiplexers 670a through 670d, respectively.

Each buffer/multiplexer 670 receives pilot symbols and the preconditioned symbols from TX subband spatial processors 640 for the $N_D$ data subbands. Each buffer/multiplexer 670 then multiplexes pilot symbols, preconditioned symbols, and zeros for the pilot subbands, data subbands, and unused subbands, respectively, to form a sequence of $N_F$ transmit symbols for that symbol period. During calibration, pilot symbols are transmitted on the designated subbands. Multipliers 668a through 668d cover the pilot symbols for the four antennas with Walsh sequences $W_1$ through $W_4$, respectively, assigned to the four antennas, as described above and shown in Table 1. Each buffer/multiplexer 670 provides a stream of transmit symbols $x_i(n)$ for one transmit antenna, where the transmit symbol stream comprises concatenated sequences of $N_F$ transmit symbols.

The spatial processing and OFDM modulation is described in further detail in the aforementioned provisional U.S. Patent Application Ser. No. 60/421,309.

In various embodiments of the invention as described herein, peer-peer communication between the various user terminals (UTs or STAs) in the same basic service set (BSS) or different BSSs can be implemented as described below. The UTs or STAs that calibrate with a single access point (AP) are members of a basic service set (BSS). The single access point is a common node to all UTs in the BSS. The calibration methods as described above facilitate the following types of communication:

(i) A UT in the BSS can use TX steering to communicate directly with the AP on the uplink (UL) and the AP can use TX steering to communicate with the UTs on the downlink (DL).

(ii) A UT in the BSS can communicate directly with another UT in the same BSS using steering. In this case, this peer-peer communication has to be bootstrapped because neither UT knows the channel between them. In various embodiments, the bootstrap procedure works as follows:

The initiator of the peer-peer link is the designate AP (DAP), and the other UT is the designated UT (DUT).

The DAP sends MIMO pilot to the DUT along with a request to establish link, which contains the BSS ID plus the DAP ID. The request needs to be sent in a common mode (i.e. Tx diversity).

The DUT responds by sending back steered MIMO pilot plus an acknowledgement which contains the DUT ID, its BSS ID, and some rate indicator for the DAP to use.

The DAP can then use steering on the DL and the DUT can use steering on the UL. Rate control and tracking can be accommodated by breaking the transmissions into DL and UL segments with sufficient time between them to allow for processing.

(iii) UTs that belong to one BSS (e.g., BSS1) can steer to UTs that belong to another BSS (e.g., BSS2), even though each has calibrated with a different AP. However, there will be a phase rotation ambiguity (per subband) in this case. This is because the calibration procedure as described above establishes a reference which is unique to the AP it has calibrated with. The reference is a complex constant, $$\alpha(k, j) = \frac{g_{APTX}(0)}{g_{APRX}(0)}$$

where k is the subband index and j is the AP index and 0 is the index of the reference antenna (e.g., antenna 0) used on the AP. In one embodiment, this constant is common to all UTs in a given BSS, but is independent for different BSSs.

As a result, when a UT from BSS1 communicates with a UT in BSS2, steering without correction or compensation for this constant may result in a phase rotation and amplitude scaling of the entire eigensystem. The phase rotation can be determined through the use of pilot (steered and unsteered) and removed in the receivers of each respective UT. In one embodiment, the amplitude correction or compensation can simply be an SNR scaling and can be removed by estimation of the noise floor at each receiver, which may impact rate selection.

In various embodiments, the peer-peer exchange between UTs that belong to different BSSs may work as follows:

The initiator of the peer-peer link (e.g., UT in BSS1) is the designate AP (DAP), and the other UT (e.g., UT in BSS2) is the designated UT (DUT).

The DAP sends MIMO pilot to the DUT along with a request to establish link, which contains the respective BSS ID plus the DAP ID. The request needs to be sent in a common mode (i.e. Tx diversity).

The DUT responds by sending back steered MIMO pilot plus an acknowledgement which contains DUT ID, its BSS ID, and some rate indicator for the DAP to use.

The DAP receiver (Rx) can estimate the phase rotation on the uplink (UL) and apply the correction constant to each subband. The DAP can then use steering on the downlink (DL) but needs to include a preamble of steered reference on at least the first steered packet to allow the DUT receiver (Rx) to correct or compensate for the phase rotation on the DL for each subband. Subsequent DL transmissions may not require a steered reference preamble. Rate control and tracking can be accommodated by breaking the transmissions into DL and UL segments with sufficient time between them to allow for processing.

The calibration techniques described herein may be implemented by various means. For example, these techniques may be implemented in hardware, software, or a combination thereof. For a hardware implementation, the techniques may be implemented at the access point and user terminal within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the calibration techniques may be implemented with modules (e.g., procedures, functions, and so on) that perform the functions described herein. The software codes may be stored in a memory unit (e.g., memory units 532 and 582 in FIG. 5) and executed by a processor (e.g., controllers 530 and 580, as appropriate). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for calibrating downlink and uplink channels in a wireless communication system, comprising:
   obtaining an estimate of a downlink channel response;
   obtaining an estimate of an uplink channel response;
   determining first and second sets of correction factors based on the estimates of the downlink and uplink channel responses; and
   calibrating the downlink channel and uplink channel based on the first and second sets of correction factors and a scaling value to form a calibrated downlink channel and a calibrated uplink channel, wherein the scaling value is indicative of an average difference between the estimate of the downlink channel response and the estimate of the uplink channel response.

2. The method of claim 1, wherein the first set of correction factors is used to scale symbols prior to transmission on the downlink channel and the second set of correction factors is used to scale symbols prior to transmission on the uplink channel.

3. The method of claim 1, wherein the first set of correction factors is used to scale symbols received on the downlink channel and the second set of correction factors is used to scale symbols received on the uplink channel.

4. The method of claim 1, wherein the first and second sets of correction factors are determined based on the following equation:

$$\hat{H}_{up}\hat{K}_{ut}=(\hat{H}_{dn}\hat{K}_{ap})^T,$$

where $\hat{H}_{dn}$ is a matrix for the estimate of the downlink channel response, $\hat{H}_{up}$ is a matrix for the estimate of the uplink channel response, $\hat{K}_{ap}$ is a matrix for the first set of correction factors, $\hat{K}_{ut}$ is a matrix for the second set of correction factors, and "$T$" denotes a transpose.

5. The method of claim 4, wherein determining the first and second sets of correction factors includes:
   computing a matrix $C$ as an element-wise ratio of the matrix $\hat{H}_{up}$ over the matrix $\hat{H}_{dn}$; and
   deriving the matrices $\hat{K}_{ap}$ and $\hat{K}_{ut}$ based on the matrix $C$.

6. The method of claim 5, wherein the deriving the matrix $\hat{K}_{ut}$ includes:
   normalizing each of a plurality of rows of the matrix $C$; and
   determining a mean of the plurality of normalized rows of the matrix $C$,
   wherein the matrix $\hat{K}_{ut}$ is formed based on the mean of the plurality of normalized rows.

7. The method of claim 5, wherein the deriving the matrix $\hat{K}_{ap}$ includes:
   normalizing each of a plurality of columns of the matrix $C$; and
   determining a mean of inverses of the plurality of normalized columns of the matrix $C$,
   wherein the matrix $\hat{K}_{ap}$ is formed based on the mean of the inverses of the plurality of normalized columns.

8. The method of claim 4, wherein the matrices $\hat{K}_{ut}$ and $\hat{K}_{ap}$ are derived based on a minimum mean square error (MMSE) computation.

9. The method of claim 8, wherein the MMSE computation minimizes a mean square error (MSE) given as $$|\hat{H}_{up}\hat{K}_{ut}-(\hat{H}_{dn}\hat{K}_{ap})^T|^2.$$

10. The method of claim 4, wherein a first set of matrices of correction factors for the downlink channel is determined for a first set of subbands, the method further comprising:
    interpolating the first set of matrices to obtain a second set of matrices of correction factors for the downlink channel for a second set of subbands.

11. The method of claim 1, wherein the estimates for the downlink and uplink channel responses are normalized to account for receiver noise floor.

12. The method of claim 1, wherein the determining the first and second sets of correction factors is performed at a user terminal.

13. The method of claim 1, wherein the estimates of the downlink and uplink channel responses are each obtained based on a pilot transmitted from a plurality of antennas and orthogonalized with a plurality of orthogonal sequences.

14. The method of claim 1 wherein the estimate of the uplink channel response is obtained based on a pilot transmitted on the uplink channel and wherein the estimate of the downlink channel response is obtained based on a pilot transmitted on the downlink channel.

15. An apparatus in a wireless communication system, comprising:
    means for obtaining an estimate of a downlink channel response;
    means for obtaining an estimate of an uplink channel response;

means for determining first and second sets of correction factors based on the estimates of the downlink and uplink channel responses; and means for calibrating the downlink channel and uplink channel based on the first and second sets of correction factors and a scaling value to form a calibrated downlink channel and a calibrated uplink channel, wherein the scaling value is indicative of an average difference between the estimate of the downlink channel response and the estimate of the uplink channel response.

16. The apparatus of claim 15, wherein the first and second sets of correction factors are determined based on the following equation:

$$\underline{\hat{H}}_{up}\hat{\underline{K}}_{ut}=(\underline{\hat{H}}_{dn}\hat{\underline{K}}_{ap})^T,$$

where $\underline{\hat{H}}_{dn}$ is a matrix for the estimate of the downlink channel response, $\underline{\hat{H}}_{up}$ is a matrix for the estimate of the uplink channel response, $\hat{\underline{K}}_{ap}$ is a matrix for the first set of correction factors, $\hat{\underline{K}}_{ut}$ is a matrix for the second set of correction factors, and "$T$" denotes a transpose.

17. The apparatus of claim 16, wherein the means for determining the first and second sets of correction factors includes:

means for computing a matrix C as an element-wise ratio of the matrix $\underline{\hat{H}}_{up}$ over the matrix $\underline{\hat{H}}_{dn}$; and means for deriving the matrices $\hat{\underline{K}}_{ap}$ and $\hat{\underline{K}}_{ut}$ based on the matrix C.

18. The apparatus of claim 17, wherein the means for deriving the matrix $\hat{K}_{ut}$ includes:

means for normalizing each of a plurality of rows of the matrix C; and means for determining a mean of the plurality of normalized rows of the matrix C, and wherein the matrix $\hat{\underline{K}}_{ut}$ is formed based on the mean of the plurality of normalized rows.

19. The apparatus of claim 17, wherein the means for deriving the matrix $\hat{K}_{ap}$ includes:

normalizing each of a plurality of columns of the matrix C; and determining a mean of inverses of the plurality of normalized columns of the matrix C, wherein the matrix $\hat{K}_{ap}$ is formed based on the mean of the inverses of the plurality of normalized columns.

20. The apparatus of claim 16, wherein the matrices $\hat{\underline{K}}_{ut}$ and $\hat{K}_{ap}$ are derived based on a minimum mean square error (MMSE) computation.

21. The apparatus of claim 20, wherein the MMSE computation minimizes a mean square error (MSE) given as $$|\underline{\hat{H}}_{up}\hat{\underline{K}}_{ut}-(\underline{\hat{H}}_{dn}\hat{\underline{K}}_{ap})^T|_2.$$

22. The apparatus of claim 16, wherein a first set of matrices of correction factors for the downlink channel is determined for a first set of subbands, the apparatus further comprising:

means for interpolating the first set of matrices to obtain a second set of matrices of correction factors for the downlink channel for a second set of subbands.

23. The apparatus of claim 15, further comprising means for normalizing the estimates for the downlink and uplink channel responses to account for receiver noise floor.

24. The apparatus of claim 15, wherein the estimates of the downlink and uplink channel responses are each obtained based on a pilot transmitted from a plurality of antennas and orthogonalized with a plurality of orthogonal sequences.

25. An apparatus in a wireless communication system, comprising:

one or more processors configured to obtain an estimate of a downlink channel response, to obtain an estimate of an uplink channel response, to determine first and second sets of correction factors based on the estimates of the downlink and uplink channel responses, and to calibrate the downlink channel and uplink channel based on the first and second sets of correction factors and a scaling value to form a calibrated downlink channel and a calibrated uplink channel, wherein the scaling value is indicative of an average difference between the estimate of the downlink channel response and the estimate of the uplink channel response; and memory coupled to the one or more processors.

26. The apparatus of claim 25, wherein the first and second sets of correction factors are determined based on the following equation:

$$\underline{\hat{H}}_{up}\hat{\underline{K}}_{ut}=(\underline{\hat{H}}_{dn}\hat{\underline{K}}_{ap})^T,$$

where $\underline{\hat{H}}_{dn}$ is a matrix for the estimate of the downlink channel response, $\underline{\hat{H}}_{up}$ is a matrix for the estimate of the uplink channel response, $\hat{\underline{K}}_{ap}$ is a matrix for the first set of correction factors, $\hat{\underline{K}}_{ut}$ is a matrix for the second set of correction factors, and "$T$" denotes a transpose.

27. The apparatus of claim 26, wherein the one or more processors is further configured to:

compute a matrix C as an element-wise ratio of the matrix $\underline{\hat{H}}_{up}$ over the matrix $\underline{\hat{H}}_{dn}$; and derive the matrices $\hat{\underline{K}}_{ap}$ and $\hat{\underline{K}}_{ut}$ based on the matrix C.

28. The apparatus of claim 27, wherein the one or more processors is further configured to:

normalize each of a plurality of rows of the matrix C; and determine a mean of the plurality of normalized rows of the matrix C, wherein the matrix $\hat{\underline{K}}_{ut}$ is formed based on the mean of the plurality of normalized rows.

29. The apparatus of claim 27, wherein the one or more processors is further configured to:

normalize each of a plurality of columns of the matrix C; and determine a mean of inverses of the plurality of normalized columns of the matrix C, wherein the matrix $\hat{K}_{ap}$ is formed based on the mean of the inverses of the plurality of normalized columns.

30. The apparatus of claim 26, wherein the matrices $\hat{\underline{K}}_{ut}$ and $\hat{K}_{ap}$ are derived based on a minimum mean square error (MMSE) computation.

31. The apparatus of claim 30, wherein the MMSE computation minimizes a mean square error (MSE) given as $$|\underline{\hat{H}}_{up}\hat{\underline{K}}_{ut}-(\underline{\hat{H}}_{dn}\hat{\underline{K}}_{ap})^T|^2.$$

32. The apparatus of claim 26, wherein a first set of matrices of correction factors for the downlink channel is determined for a first set of subbands, the one or more processors further configured to:

interpolate the first set of matrices to obtain a second set of matrices of correction factors for the downlink channel for a second set of subbands.

33. The apparatus of claim 25, wherein the one or more processors is further configured to normalize the estimates for the downlink and uplink channel responses to account for receiver noise floor.

34. A non-transitory computer-readable storage medium encoded with instructions executable to:
- obtain an estimate of a downlink channel response;
- obtain an estimate of an uplink channel response;
- determine first and second sets of correction factors based on the estimates of the downlink and uplink channel responses; and
- calibrate the downlink channel and uplink channel based on the first and second sets of correction factors and a scaling value to form a calibrated downlink channel and a calibrated uplink channel, wherein the scaling value is indicative of an average difference between the estimate of the downlink channel response and the estimate of the uplink channel response.

* * * * *